United States Patent [19]

Jaqua

[11] Patent Number: 4,998,167

[45] Date of Patent: Mar. 5, 1991

[54] HIGH RESOLUTION TRANSLATION OF IMAGES

[76] Inventor: Douglas A. Jaqua, 11431 Tampa Ave., Unit 83, Northridge, Calif. 91326

[21] Appl. No.: 437,017

[22] Filed: Nov. 14, 1989

[51] Int. Cl.$^5$ .................. H04N 7/01; H04N 7/04; H04N 11/20; H04N 11/06

[52] U.S. Cl. .................. 358/140; 358/11; 358/12; 358/141

[58] Field of Search ............... 358/140, 11, 12, 141

[56] References Cited

U.S. PATENT DOCUMENTS

| | | | |
|---|---|---|---|
| 4,335,395 | 6/1982 | Clarke | 358/11 |
| 4,766,484 | 8/1988 | Clayton | 358/23 |
| 4,876,596 | 10/1989 | Faroudja | 358/140 |
| 4,896,212 | 1/1990 | Chantelou | 358/140 |

OTHER PUBLICATIONS

"Handbook of Recommended Standards and Procedures", International International Teleproduction Society (1987), pp. 15-16, 17-18, 19, 23, 38-41, 132-140, 173-199, 266-271.

Technical Review No. 8, Digital Video Processing/-DICE, Independent Broadcast Authority (1976), pp. 31-40, 49-62. (pp. 2-84).

ISIS, International Broadcast Engineer, vol. 22, No. 22D, (Mar. 1989), pp. 40-43. (Total 2 Pages).

ADAC Broadcast Television Standards Converter; Date Unknown, pp. 1-6 (Pages 1-24).

Problems in the PAL Tape to Film System, The BKSTS Journal (Dec. 1985), p. 670 (pp. 670-673).

A Digital Standards-Converter for Television Using Intra-Frame Line Interpolation Techniques IEEE International Conference on Communications Conference Record (Jun. 1974), pp. 7C-1 to 7C-5. (pp. 1-7C-5).

Television Standards Using Digital Techniques, The Radio and Electronic Engineer, vol. 43, No. 3 (Mar. 1973), pp. 230-232.

Digital Fields Store Television Standards Converter, International Broadcasting Convention Record, (23-27 Sep. 1974), pp. 104-113.

Developments in Standard Conversion, Internatonal Broadcasting Convention Record, (25-29 Sep. 1978), pp. 202-205.

Primary Examiner—John K. Peng

[57] ABSTRACT

A method of translating a series of groups of video fields into a new series of groups of video fields, where each group represents lines of a single image at a single point in time of a moving picture. A representation of each of a series of the single images representing a moving picture is created from within the group of fields representing each such single image.

40 Claims, 17 Drawing Sheets

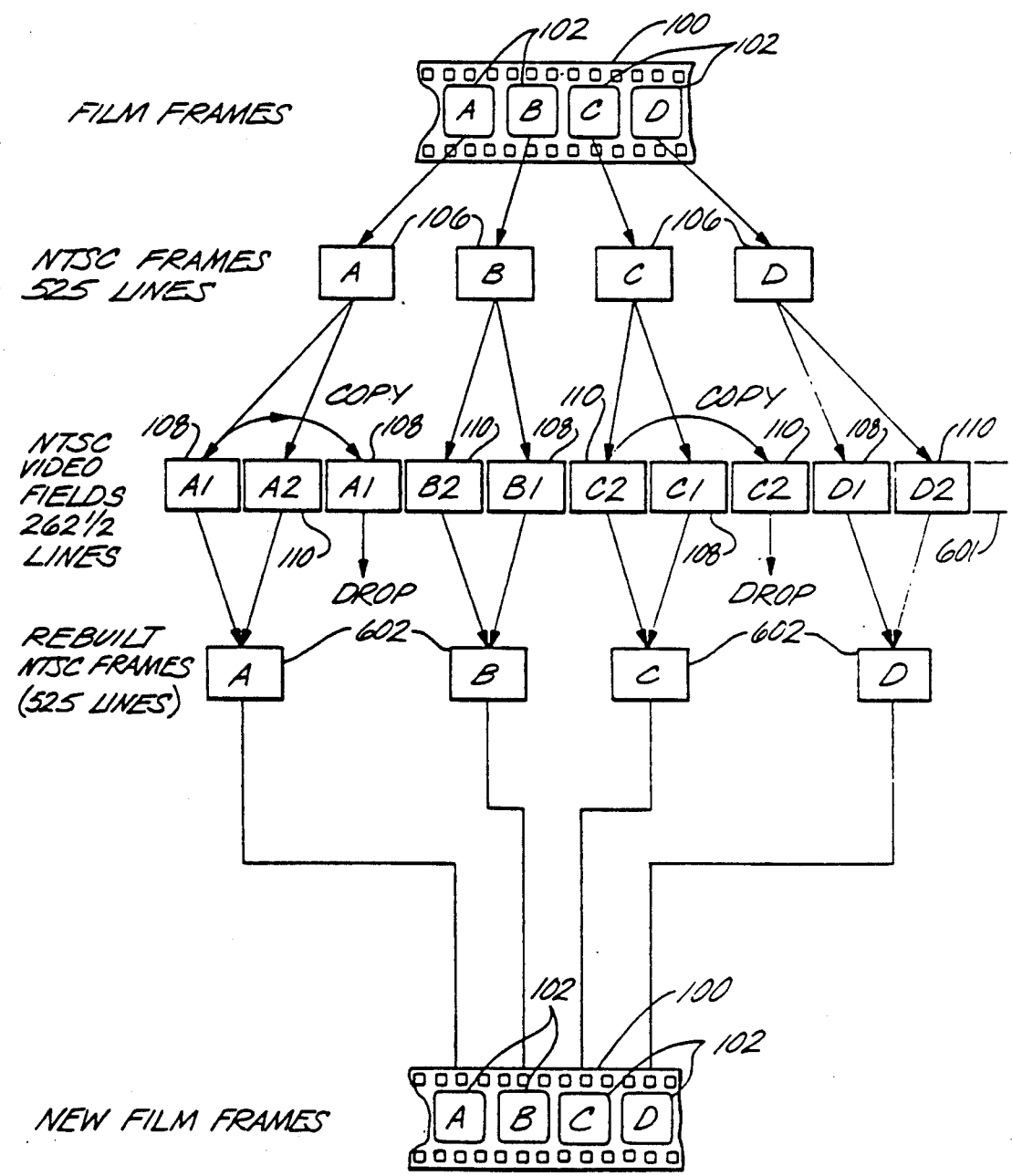

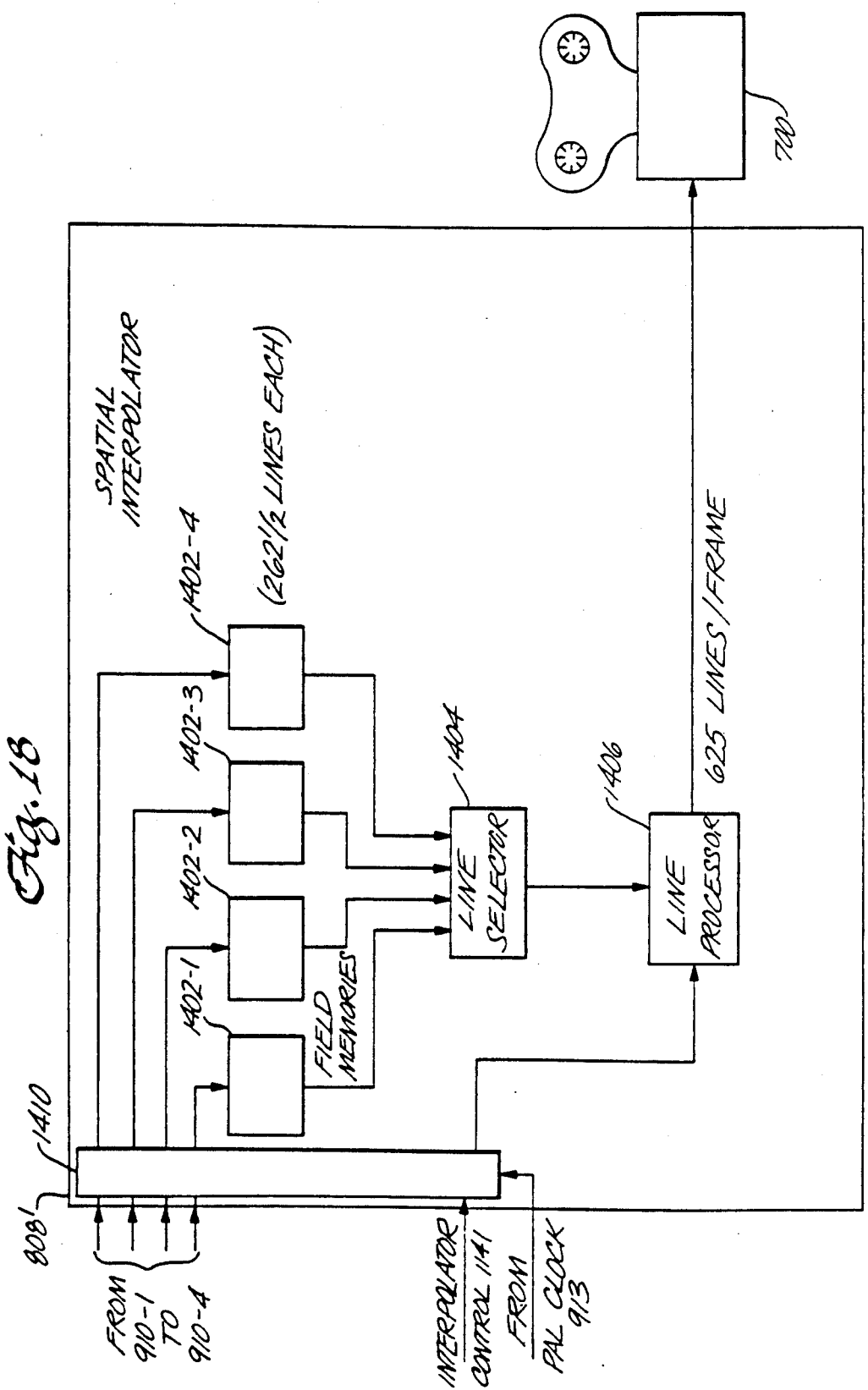

HIGH RESOLUTION TRANSLATION OF IMAGES

FIELD OF THE INVENTION

This invention relates to the field of video image translation and more particularly to television standards conversion.

BACKGROUND OF THE INVENTION

When film is converted to video tape, the conversion is done by creating a sequence of video images from the sequence of film images. The video images, or frames, are electronic representations of the film. The illusion of motion is created in film and video by rapidly showing multiple images on a screen.

In film, the images are single exposed photographic images. However, on video tape, the images are represented as multiple lines. Typically, video television signals comprise multiple horizontal lines, where each line contains brightness information, or luminance, and color information, or chrominance, for a specific vertical location on a television screen. Since most spatial interpolators manipulate the line information as digital data, the operation of the spatial interpolator does not depend on the method used to encode the luminance and chrominance information onto a line. The encoding method used is usually only relevant to the converter which does the initial conversion of the electronic signal into digital luminance and chrominance data.

In both film and video, the images are designed to be shown at a fixed rate, so that a viewer sees the film or video at roughly the speed that the images were captured. Moving picture film is taken and shown at a characteristic frequency, expressed in frames/second ("fr/s"). Most U.S. moving picture film is shown at 24 fr/s. Video tape is also shown at a characteristic frequency as well, but also has images with a characteristic number of vertical lines per image.

Due to the history of television, different parts of the world have adopted different standards for broadcast television and video tape. In North America, the standard is 30 fr/s (or images/second) and 525 lines/image; this standard is sometimes called NTSC (after the National Television Standards Committee). In the United Kingdom and parts of Europe, the standard is 25 fr/s (or images/second) and 625 lines/image; this standard is sometimes called PAL (Phase Alternate Line). Film in North America is usually taken at 24 fr/s and is sometimes shown in other parts of the world as a moving picture at 25 fr/s, which only slightly increases the speed of the moving picture relative to the speed at which the images were recorded. Although the terms "NTSC" and "PAL" refer to color standards as well as field frequencies and line densities, the terms are used herein to generally describe standards with differing field frequencies and lines per image without regard to any differences in color encoding schemes.

Film is inconvenient to edit, since editing requires that film be physically cut. The editing process is tedious, expensive and in the end results in the loss of frames. Video editing can be done electronically copying the original, allowing many attempts at editing to be done without loss of the original material. Video editing can be more expedient, without the delays required of film developing, splicing and printing.

Standards converters exist to take video, edited or otherwise, from one standard and create video in another standard. The conversion from one standard to another consists of creating an output sequence of images (or frames) from the input sequence of images, adjusting the number of images per unit time and the number of lines per image from the input standard to the output standard.

Both NTSC and PAL standards require that each video image or frame be divided into two video fields. Each video field contains half the lines of an image or frame. In NTSC, a field consists of 262½ lines; in PAL, a field consists of 312½ lines. To display a full frame on a television screen in either standard, the television receives the first field and fills the entire screen with the 262½ or 312½ lines of the first field, then receives the second field and intersperses the lines of the second field between each of the lines of the first field.

Since persistence of a television screen is created by a combination of television tube phosphor and the behavior of the human eye, the lines of the first field still persists on the screen when the lines of the second field are shown, and the lines of the second field persists on the screen when the lines of the first field of the next frame are shown onto the screen. Since two fields are always shown onto a screen sequentially, fields are stored on tape sequentially. In editing the video, it is possible that two fields that make up a frame, each may be from a different image.

Another problem with video fields occurs in NTSC format, which uses 5 video fields for every 2 film frames. Film is generally created by photographing a scene 24 times per second, making 24 frames/second, whereas the NTSC video standard has 60 fields/sec. To get 60 fields from 24 film frames per second, additional fields must be created. The standard method of creating extra fields is known in the art as "adding a 3-2 cadence." Editing video generally destroys the 3-2 pattern.

The PAL standard requires 50 fields/sec. Since film frames are shot at 24 frames/sec, resulting in only 48 fields/sec, some manipulation must be done to add two fields/sec. Several solutions have been used: playing the program back at a slightly higher speed; filming at 25 frames/sec; or duplicating a field every ½ second. Due to the various world standards for both film and video, processes known as standards conversion have been created. The typical standards converter employs a blend of frames to minimize picture disturbances caused by the various picture creation technique.

In converting from one standard to another, one must take into consideration the different frequencies, the differing number of lines, and the different formats of encoding an electronic signal. The conversion of formats is quite straightforward, given that the formats are designed such that television circuitry can easily convert a signal into data made up of lines which represent the varying color and intensity of the video signal on a horizontal line of the screen. Accounting for the number of lines and the number of fields/second is more difficult.

In moving from one standard to another, frames need to be created at points in time where no frame existed in the original standard, and lines are created where no lines existed in the original standard. Lines in the new standard are created by an interpolator which interpolates lines of the old standard that are close spatially to the new line, with lines that are closer given greater weight. Likewise, if fields must be created in the new standard where none existed in the old standard, the new fields are created by temporally interpolating the fields that are closest in time to the new field, and the closest fields are given greater weight. Thus, if the number of fields/sec and the number of lines/field changes from one standard to another, each line in the new standard is a weighted average of lines in the old standard which are nearby in space and time. Because of this averaging process, the edges of moving objects in a scene may not be as sharp as in the original standard.

In doing field by field interpolation, more than one field has been used to increase spatial resolution, but only one field should be used when an object on the screen is in motion, to prevent the blurring of edges.

The process of detecting motion, and adjusting the interpolation process based on the amount of motion is known as motion adaptive interpolation. Simple algorithms for motion adaptive interpolation are known in the art. For example, U.S. Pat. No. 4,766,484 discloses an apparatus which takes as its input video fields in one standard and outputs video fields in another standard, using motion adaptive interpolation and field interpolation. However if the original image was created on film and subsequently transferred to video, the apparatus described combines the input fields without regard to the original film frame from which the input fields were derived.

A description of the details of various television standards in use around the world, and of shortcomings in current methods of video tape editing can be found in *Handbook of Recommended Standards & Procedures*, International Teleproduction Society (1987). A discussion of spatial interpolation and temporal interpolation can be found in *I.B.A. Technical Review Number 8, Digital Video Processing-DICE* (1976). The methods discussed in *I.B.A. Technical Review* show how to convert from one standard to another, but the conversion methods discussed therein have proven to yield less than desirable results in terms of image sharpness.

SUMMARY OF THE INVENTION

The shortcoming of the prior art may be substantially reduced or eliminated using the present invention.

Briefly, an embodiment of the invention is a method translating a series of groups of video fields, where each group represents lines of a single image at a single point in time of a moving picture. A representation of each of a series of the single images representing a moving picture is created from within the group of fields representing each such single image. Preferably, lines represented within each group of fields are interpolated to create each such single image in the series. Also, preferably, the series of groups have different numbers of fields in a repeating pattern and the step of creating involves the step of selecting the same number of fields out of each of a series of the groups to form the single image corresponding to each such group in the series.

A preferred embodiment is also a method of creating, from a first sequence of fields, a second sequence of fields. Each sequence of fields represents the same series of images of a moving picture. Each image is at a single point in time. The first sequence has a plurality of groups of plural fields where each group represents a different single one of the images. Each field of the first sequence has a first number of lines per field and each field of the second sequence has a second number of lines per field. The method involves determining which of the fields in the first sequence belong in the same group representing a single image. Selecting such fields from the first sequence, that are determined to be in the same group of fields representing a single image, and deriving from each of the selected fields a different group of the fields in the second series. Each group of fields in the second series represents the same single image as the group of fields from which it is derived. Preferably, the groups of fields in the second series are derived with a second number of lines that is different from the first number. Also, preferably, at least some of the groups of fields in the second group are derived with a different number of fields in a group than the groups from which it is derived. The group of fields in the second series is also preferably formed with a different cadence of the groups of fields as a cadence of the groups of fields in the first series. Preferably, each group of fields in the first series is derived from a single frame of a moving picture film. Also, preferably, each of the fields in the second series is formed with a representation of lines which together with the representation of lines of another field in the same group represent the complete single image. Preferably, the lines represented by the fields within the selected group are interpolated to the corresponding group of fields in the second group and preferably each field of each group in the second series representations is formed from lines derived from the same group of fields representing a single image.

One preferred embodiment of the invention is a method for translation between first and second video image formats where, in the first video image format there is a series of video fields representing first frames. The frames have different numbers of fields and the fields of each frame represent a portion of the lines of a single image at a single point in time in a series of the images. The number of fields making up the series of first frames repeat in a pattern. A unique cadence number is assigned to each field so as to indicate fields in the same frame in each repeated pattern. The series of video fields is received. An indication of the cadence number for each received field is provided in each repeated pattern of fields. Line representations of each of the fields indicated by the cadence numbers to be from the same frame are spatially interpolated to form representations of interpolated lines for each of a series of further frames.

Briefly, an embodiment of the invention is a method for translation between first and second video image formats where, in the first video image format there is a series of video fields forming first frames, the frames having different numbers of the fields and the fields of each frame representing a portion of the lines of a single image at a single point in time in a series of the images. A field group is selected comprising at least one field from the same frame from each of a series of the first frames. Lines represented in the same field group of each of a series of field groups are spatially interpolated to form interpolated lines. A series of second frames representing lines are formed. The lines represented in each such second frame represent lines from or obtained while spatially interpolating from the same field group.

Another preferred embodiment of the invention is a method of creating, from a first sequence of fields, a second sequence of fields, where each sequence of fields represents the same series of images of a moving picture. Each image is at a single point in time. The first sequence has a plurality of groups of plural fields where each group represents a different single one of the images. Each field of the first sequence has a first number of lines per field and each field of the second sequence has a second number of lines per field where the first and second numbers of lines differ. The fields are determined which belong in the same group representing a single scene. Fields are selected for spatial interpolation, from the first sequence, that are determined to be in the same group of fields representing a single scene. The lines of the selected fields of the first sequence are spatially interpolated to derive the lines of at least one of the fields of the second sequence.

Preferably, each of a plurality of the frames are built, each frame being built substantially only from the lines of the fields belonging to the same group representing a single scene. The step of interpolating spatially interpolates each of the built frames.

Preferably, the built frames are separated into first and second fields, each field having a different group of lines from the built frame.

Also, preferably, there is an indication of the fields that are in the same groups and the step of determining uses those indications to determine which fields represent a single scene.

Further, preferably, the first and second sequences are moving pictures to be viewed at different frequencies, the number of fields in the second sequence is changed from the number of fields in the first sequence proportional to the ratio of the frequencies.

A preferred embodiment of the invention is for converting NTSC video to PAL video, however, the invention is by no means limited to converting between those two standards.

The present invention is not limited to any particular input and output standard including, but not limited to NTSC, SECAM, PAL, and PAL-M.

BRIEF DESCRIPTION OF THE DRAWINGS

FIG. 17 is a graphic representation of a conversion process similar to FIG. 6 in which film images are converted to NTSC and then to NTSC frames and then printed on film; and FIG. 18 is a block diagram of a spatial interpolator similar to FIG. 14 for use in the standards converters of FIGS. 9, 12 and 13 in which the frames generated by the line processor 1406 are used directly by a film recorder to record the images on film.

DETAILED DESCRIPTION

Briefly, an embodiment of the invention is disclosed that involves the use of video derived from a series of film frames, each individually representing a single image at a single point in time and together forming a moving picture. Film frames have been converted to NTSC video format for reading by a video reader which format has groups of fields arranged into groups or video frames where each video frame represents an original film frame. Each video field contains ½ of the line data required for a video reader to recreate on a television one complete image of a film frame. The video frames have a 3-2 cadence where some frames have three fields and some have two fields. The video may be edited making cuts and inserts from other videos and as a result the original 3-2 cadence may be destroyed. The video either in its original 3-2 cadence or in its edited form is converted to PAL standard format where the fields have more lines and the number of video frames per second is slower. During the process of converting to the PAL standard, fields are selected wherever possible from the same group or video frame so that they derive from the same original film frame. Since some film frames are represented by three NTSC fields, not all NTSC fields are used and are discarded. Each time fields are selected, the lines of each of these fields are grouped together so as to form one video frame, and the lines of that frame are spatially interpolated to build a single PAL video frame. The PAL video frame is then divided into two PAL video fields for writing by a video writer on a tape.

Figure 1:
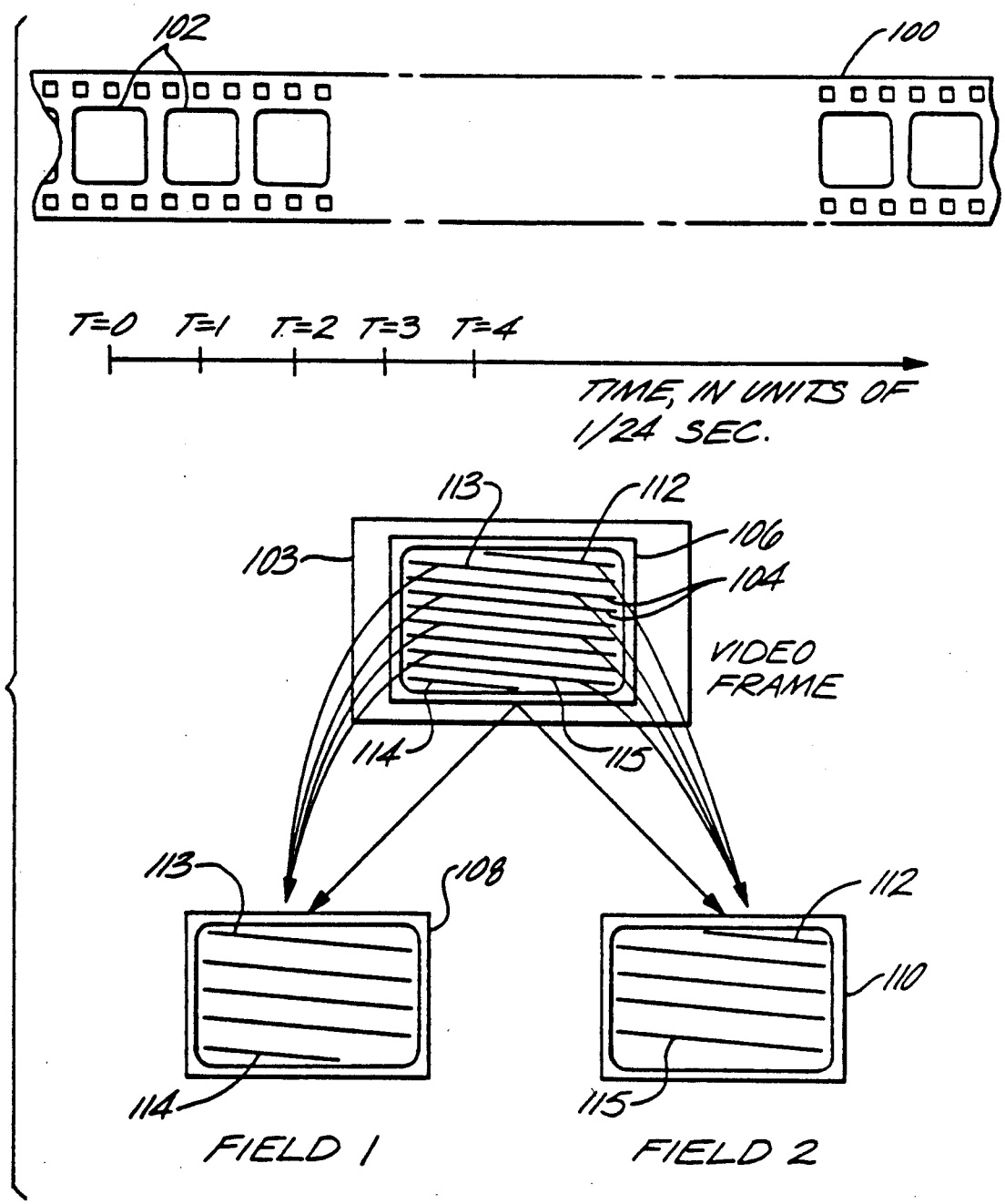
FIG. 1 is an illustration of the prior art conversion of film to video fields for display by a television.

Refer now to FIG. 1, which depicts the sequence with which scenes photographed on film are converted to video fields for display by an electronic television in the prior art. The frames 102 are images perceived by a camera at fixed moments in time. In the example shown, the camera captures an image on a frame of film 100 once every 1/24 of a second. The camera does not have to be taking a picture of a real image, instead it can be receiving artificial images such as computer generated graphics or special effects. For the frames to be viewed as a moving picture, the artificially created images in the frames need to have the same continuity as that of real images. In film, the same frame is placed on the screen twice. In video, half the frame, called a field, is placed on the screen, then the other half or field is placed on the screen.

In the NTSC standard, a video scene 106 is broken into field 1 and field 2, designated 108 and 110. Frame 106 consists of 525 lines of picture information, field 1 contains every other line of the frame, starting with the first full line, and field 2 contains the remaining lines. One line is split into two half lines 112, 114 so that each field consists of 262½ lines (for simplicity, not all 525 lines are shown in FIG. 1). One half line 112 appears just above the first full line 113 on the screen and the other half line 114 appears just below the last full line 115. The first field ends with the lower half line 114, and the second field begins with the upper half line 112.

Figure 2:
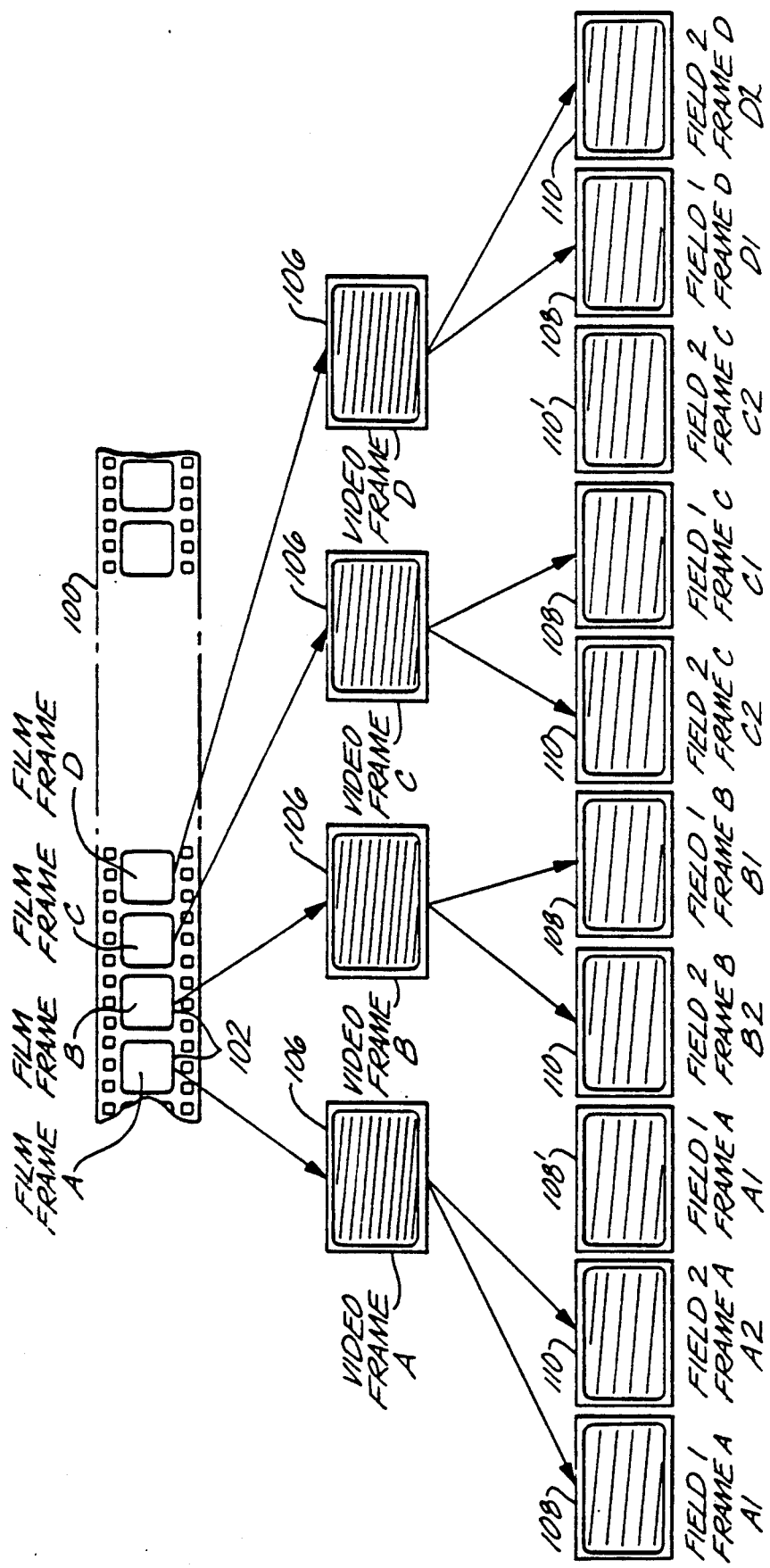
FIG. 2 is an illustration of the prior art conversion of film to NTSC video.

Refer now to FIG. 2. NTSC has a display rate of 60 fields, or 30 frames 106, per second. Since 24 fr/s film only results in 48 fields/second ("fi/s"), 6 extra frames, or 12 extra fields, are added to each second of video. This is done by duplicating one field (i.e. 108', 110') every four fields. Video frame A, derived from film frame A, splits into video field A1 and video field A2. Field A1 is then repeated, followed by field B2 and then field B1 of frame B. Since video must display a field 1 after a field 2 and a field 2 after a field 1, the first field of frame B is field B2 and field B1 comes after field B2. The pattern, or cadence, of field insertions, one field every four fields, takes ten fields, or one cadence period, to repeat. A field 1 and a field 2 are not interchangeable, since each field includes a half line and each field is designed to display at different places on the screen. This pattern is called in the art a "3-2 pulldown sequence", or "3-2 cadence".

Figure 3:
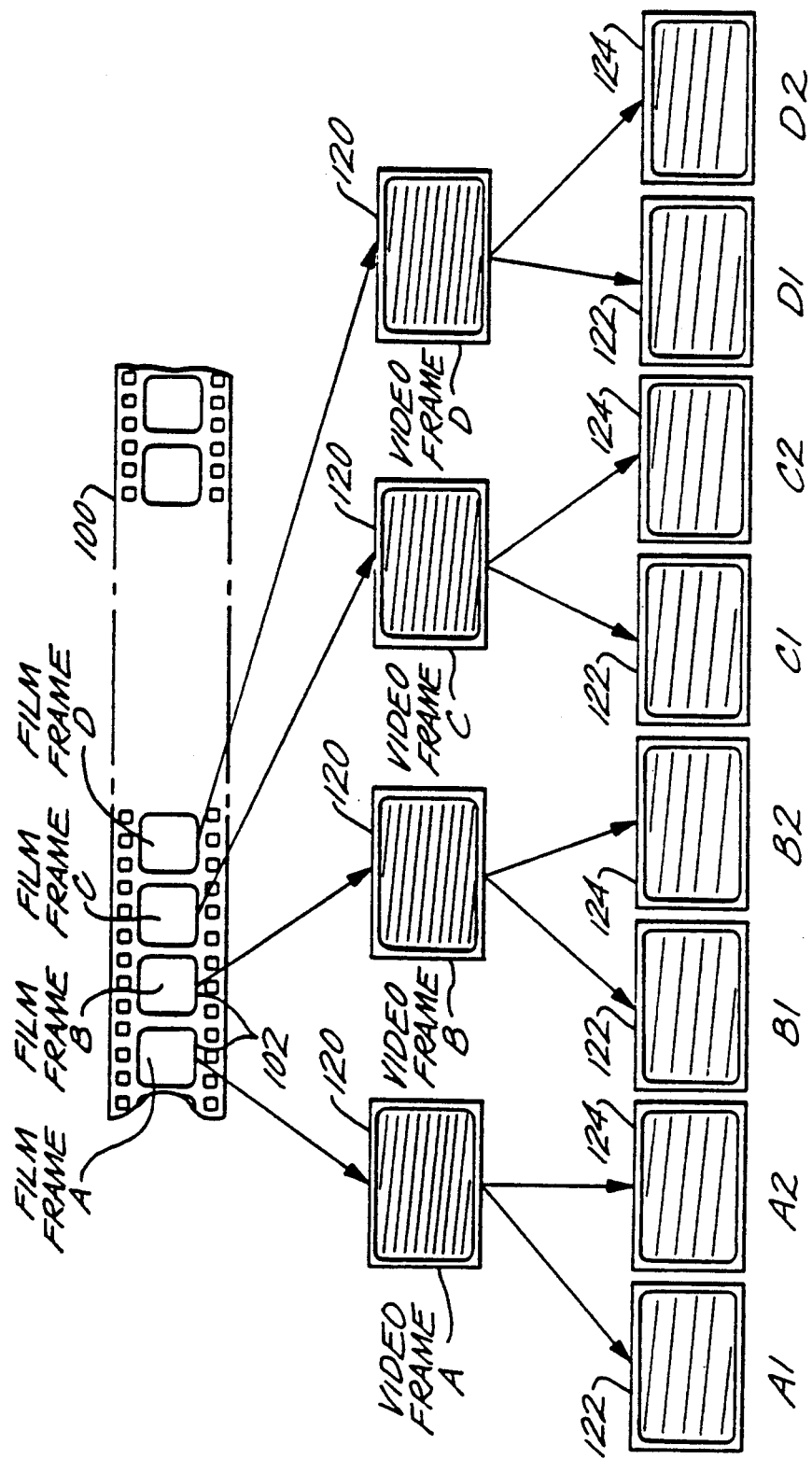
FIG. 3 is an illustration of the prior art conversion of film to PAL video.

Refer now to FIG. 3, showing the creation of a PAL video from film. This procedure requires the making of two fields out of one film frame. However, the number of lines is 625 per frame, and a field consists of 312½ lines. The fields are at a rate of 50 fi/s. Converting a 24 fr/s film to a 50 fi/s video is generally done by creating two fields from each frame, and increasing the speed of the recorded program by 4%. Using this method, no fields need to be duplicated.

Film frames 102 are converted to video frames 120, each containing 625 lines. The video frames 120 are made up of two fields 122 and 124, each containing 312½ lines. PAL fields are designated field 1 and field 2.

Since the number of fields per second and the number of lines per field are both different between the NTSC and PAL standards, both temporal and spatial interpolation are used in standards conversion. Temporal interpolation is the process of creating lines in the output standard from a combination of lines from more than one field in the input standard due to the fact that no input field exists for the exact time represented by the field in the output standard. Spatial interpolation is the process of creating the lines in the output standard from a combination of more than one line of the input fields due to the fact that no line exists in the input standard for the exact location represented by a line in the output standard. This averaging process causes the resultant video to appear "soft", so that where objects are in motion they appear blurry and the edges of objects are not as sharp in the output standard as compared to the input standard.

Figure 4:
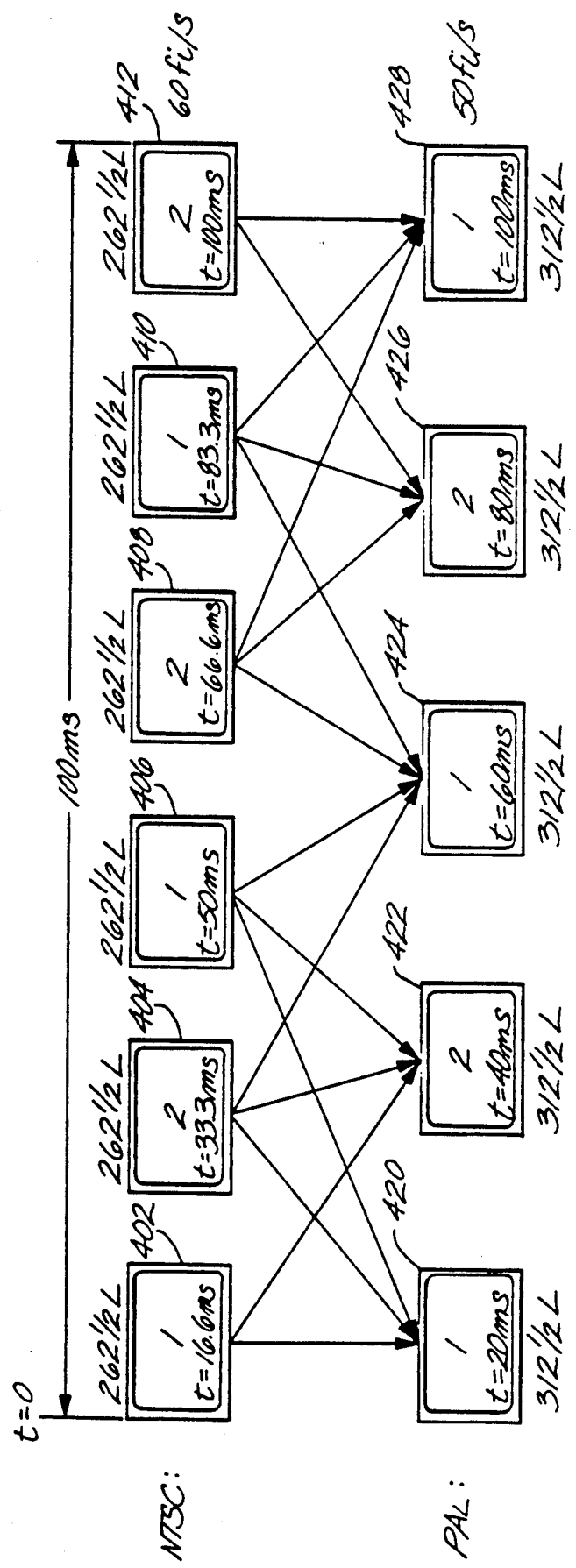
FIG. 4 is a graphic representation of the prior art method of conversion from NTSC video to PAL video.

Refer now to FIG. 4, and consider the prior art process of temporal interpolation. NTSC fields 402, 404, 406, 408, 410, and 412 represent the action in a scene at the indicated times "t" between time t=0 and t=100 ms. The PAL fields 420, 422, 424, 426, and 428 represent the same action, but at slightly different points in time. Note that the fields in each standard are field types 1 and 2, alternating. The frame designations, A, B, C, and D are not used in FIG. 4, because the NTSC fields are combined to create the PAL fields without regard to any possible cadence. The absence of any pattern in the figure is to draw attention to the fact that for the NTSC to PAL conversion to occur, it is not required that the NTSC have originally come from film. When a scene is captured directly onto NTSC video tape, field 1 and field 2 do not represent a scene at a single point in time. To create the PAL field 424 from NTSC frames, several NTSC fields are averaged. The reason for the averaging is that, by way of example, field 424 needs to represent the state of the action of the scene at t=60 ms. The NTSC standard does not have a field showing the action precisely at that time, but does have fields 404, 406, 408, and 410, showing the action at t=33.3, 50, 66.6, and 83.3 ms, respectively. PAL field 424 is created by combining NTSC fields 404 through 410. This averaging process is called temporal interpolation. It is understood that the NTSC fields are delayed long enough so that the PAL fields can be created.

Figure 5:
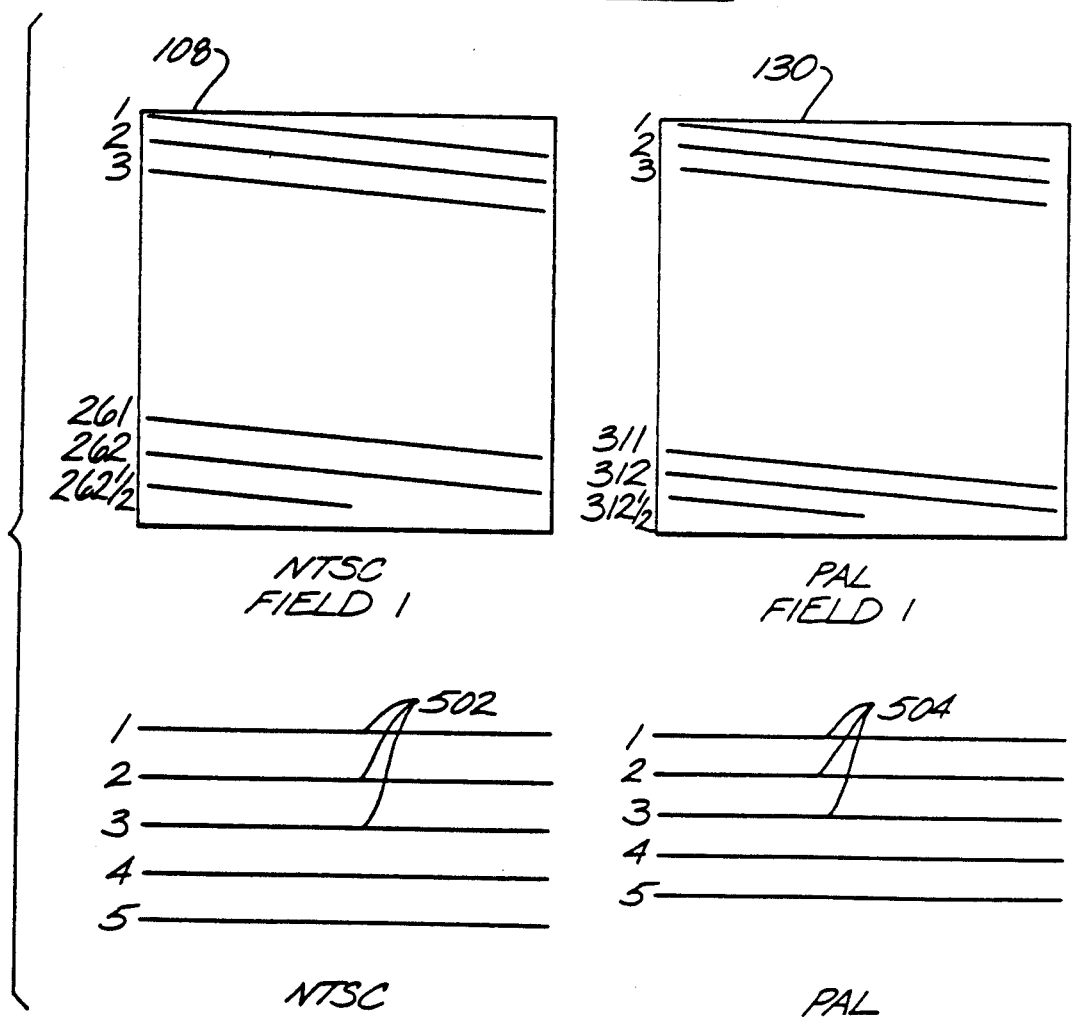
FIG. 5 is an illustration of the prior art method for adding lines going from the NTSC to PAL standard.

Refer now to FIG. 5, and consider the prior art process of spatial interpolation. To convert from NTSC to PAL, two standards specifying a different number of lines per frame, the lines in PAL are created by combining, or interpolating, NTSC lines. PAL lines are more dense than NTSC lines because a PAL field has 312½ lines and an NTSC field has only 262½ lines. Lines 504 are created from image information in lines 502. By way of example, line 1 in the PAL standard is created by merely copying line 1 in the NTSC standard, since they both represent the same vertical position of the film frame. Line 2 cannot be created by just copying a line from the NTSC standard, since there is no corresponding line to copy. Instead, PAL line 2 is created by taking a weighted average of NTSC line 1 and NTSC line 2. A similar process is done to create all 312½ PAL lines from the 262½ NTSC lines. This averaging process is called spatial interpolation.

Spatial interpolation is by its nature subject to accuracy errors. The information contained in each PAL line may be estimated from the information content of several NTSC lines. Naturally, if all 525 video frame lines, instead of only 262½, are used in the averaging process, the resultant PAL lines have a higher resolution, and the picture is clearer.

Figure 7:
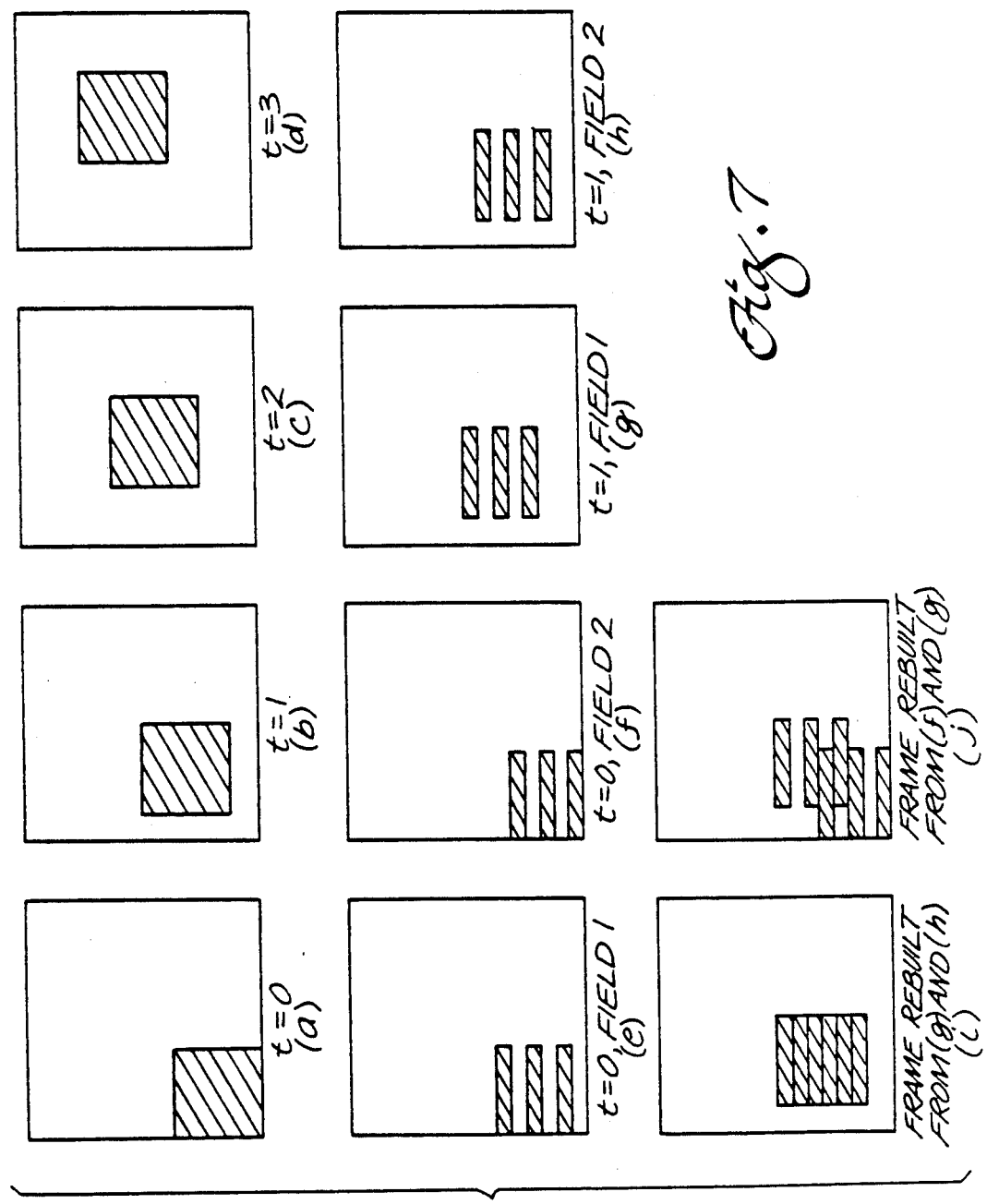
FIG. 7 is a graphic representation of the effect of a conventional conversion, between NTSC and PAL standards, on a moving scene.

Refer to FIG. 7, which illustrates one problem of the prior art that occurs in temporal interpolation and in spatial interpolation when fields deriving from more than one film frame are combined. A simplified image of a box moving across a screen is used to illustrate the point. FIG. 7(a) shows the image at time t=0. FIG. 7(b), 7(c) and 7(d) show the image at time t=1, t=2 and t=3, respectively, where the moving square has moved up two increments and to the right two increments at each line with respect to the prior time. FIGS. 7(e) and 7(f) depict fields 1 and 2 derived from the frame taken at t=0 (see FIG. 7(a)). FIGS. 7(g) and 7(h) depict fields 1 and 2 derived from the frame taken at t=1 (see FIG. 7(b)). FIG. 7(i) depicts a frame rebuilt from the two fields of FIGS. 7(g) and 7(h), which both derived from the same film frame at t=0. Note that the image fairly reflects the original image of FIG. 7(a). In contrast, FIG. 7(j) depicts a frame rebuilt from the two fields of FIG. 7(f) and 7(g), which did not derive from the same film frame. Consequently, the edges of the moving box, or any moving object, are no longer sharp and well-defined. Upon viewing a program converted using fields from different film frames, the loss of sharpness appears as if the original scene is foggy. However, a program converted using an embodiment of the present invention for arranging the fields for interpolation preserves sharp edges even during motion, as shown in FIG. 7(i). Of course, if one of two fields deriving from the same film frame has been eliminated during editing of the NTSC video tape, only one field is available for interpolation and hence frame interpolation cannot be performed.

The embodiment of the invention, through mechanisms discussed subsequently, minimizes the use of temporal interpolation in creating the fields of the output standard. According to an embodiment of the present invention, a process is disclosed wherein it is possible to derive PAL fields from NTSC fields using only frame interpolation wherever possible and with very little use of temporal interpolation.

Figure 6:
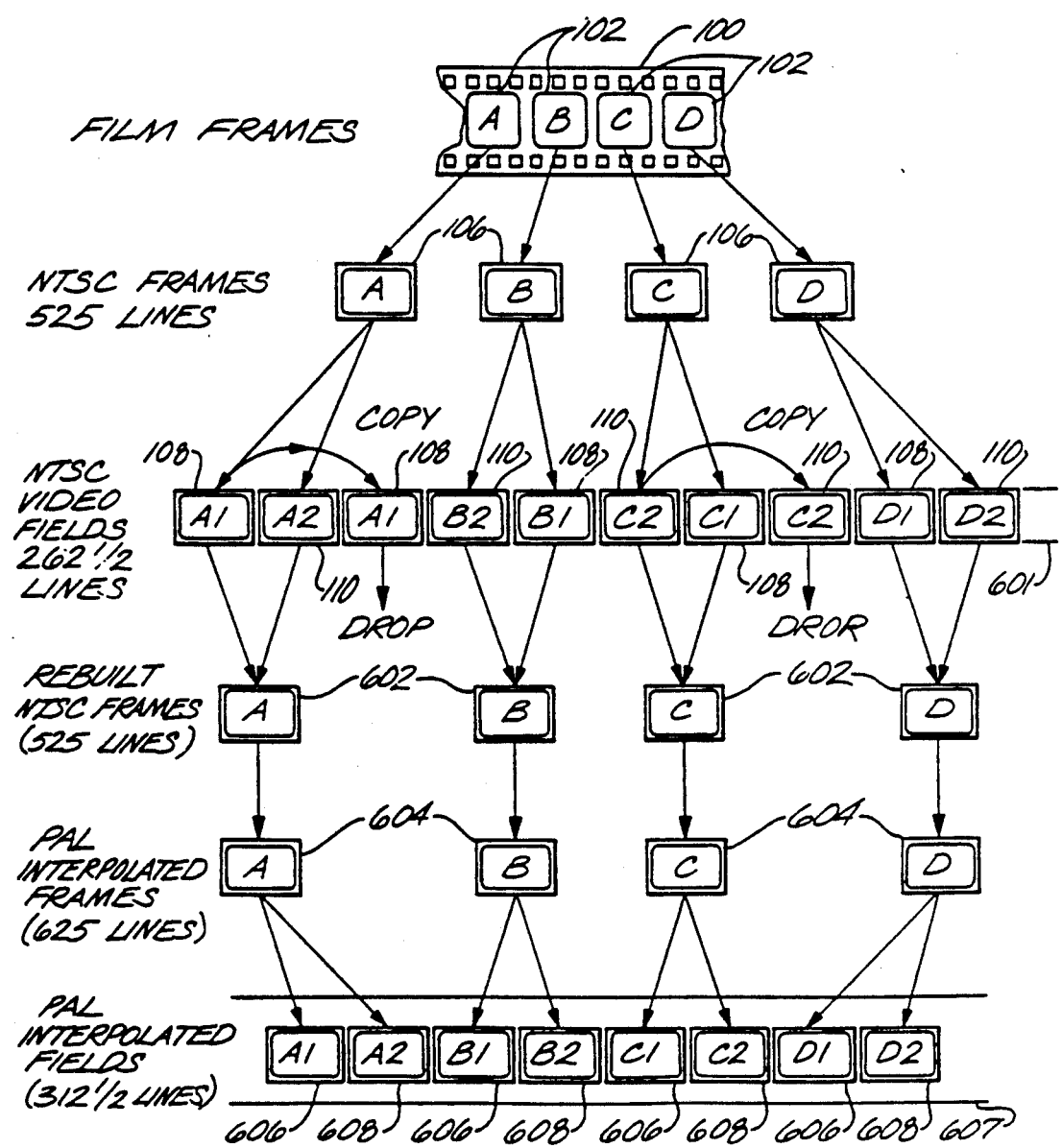
FIG. 6 is a graphic representation of the conversion of film to NTSC video and subsequent conversion of NTSC video to PAL video using a method according to the present invention.

Refer now to FIG. 6, which illustrates a process according to the present invention to convert NTSC video to PAL video.

There are no edits and therefore no new fields need to be created. Fields correctly follow the 3-2 pattern. Film 100 consisting of film frames 102 is converted to NTSC using a standard NTSC telecine process, which creates NTSC frames 106 consisting of 525 lines of picture information, made up from fields of 262½ lines each. Each frame yields a field 1 and a field 2, designated 108 and 110. One field out of every four is duplicated to arrive at the required number of fields per second for the 3-2 format of NTSC. This duplication results in the field pattern "A1-A2-A1-B2-B1-C2-C1-C2-D1-D2".

The presence of the ABCD pattern of fields is detected and the cadence of that pattern is used to determine which fields are from the same film frame or video frame (or group) to recombine to create rebuilt frames 602. The cadence is used to determine which fields are duplicates and the duplicates are eliminated. The rebuilt frames 602 (comprised of 525 lines) are then spatially interpolated into the PAL interpolated frames 604 (comprised of 625 lines), which are in turn split into the PAL interpolated fields 606, 608, which are then written to a PAL video tape 607. Interpolation from a single field will be called "field interpolation" or "low resolution interpolation". Interpolation from two fields comprising the same frame will be called, "frame interpolation", or "high resolution interpolation".

Figure 8:
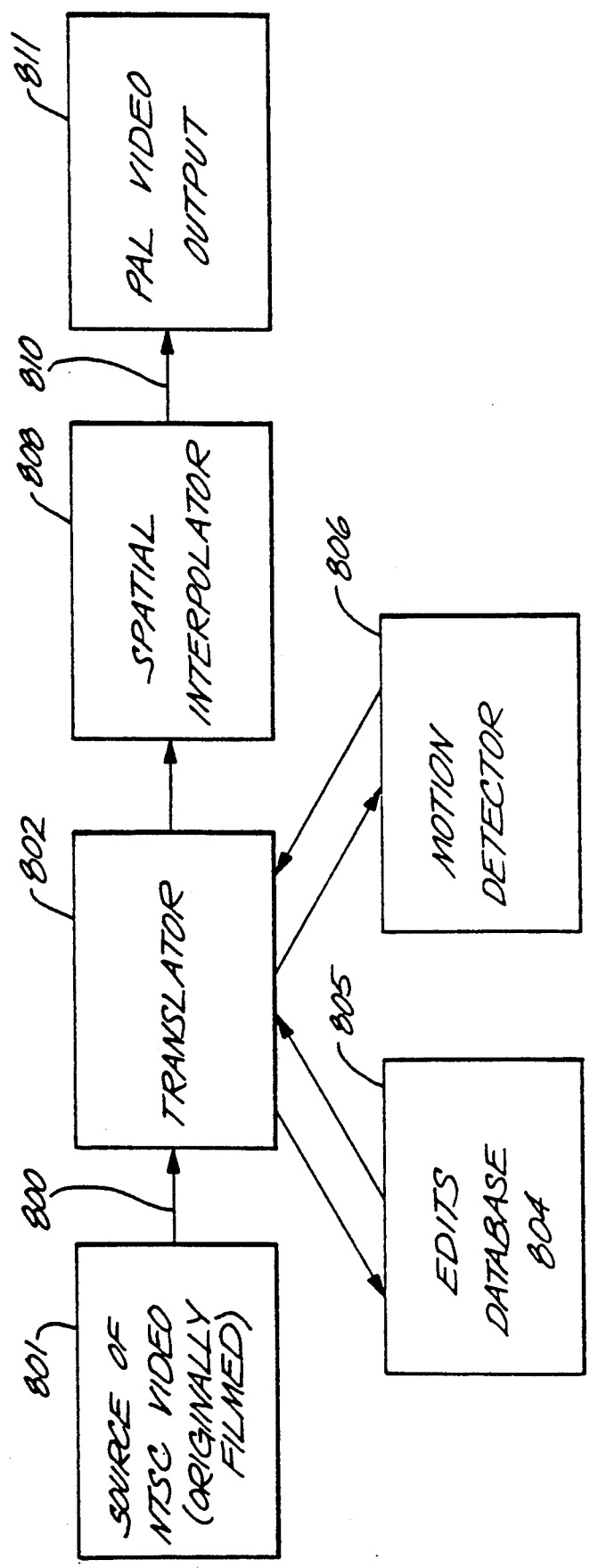
FIG. 8 is a block diagram of a standards converter and embodying the present invention.

Refer to FIG. 8, which is a block diagram of standards converter using a translation process according to one embodiment of the present invention.

NTSC video 800 signals are derived from film by a conventional source 801 such as a video film reader and as such has a 3-2 cadence. The video signals 800 are input into a translator 802, which then analyzes the incoming video signals. To aid in the analysis, the translator 802 reads information from an Edits Database ("database") 804 contained in a memory 805. The database 804 contains a list of all the editing steps that were done to the NTSC video 800. For example, an entry in the database 804 might indicate that the video was cut between a given two video fields, and therefore the scene is discontinuous. The location of each cut is identified by a time code, and this time code is indicated by the entry in the database. The details of an example of such a database are discussed subsequently. Thus, the database indicates the locations of discontinuities in the input video signal 800. These discontinuities, or lack of 3-2 cadence, can be due to the video being edited, due to non 3-2 cadence material being added, or due to the addition of special effects such as scene-to-scene fading. The information stored in the database is used to direct the translation process, as discussed subsequently.

Motion detector 806 allows an alternate way to direct the translation process. The motion detector, based on just the data contained in the video fields, generates editing information as to where cuts have been made, and as to where the 3-2 cadence does not exist. This editing information is sent back to the translator 802 to direct the translation process.

The editing information generated by the motion detector may be used to create the database 804. The information from the motion detector may be compared with the data in the database 804 by a computer to confirm proper operation of the motion detector.

Translator 802 directed by the database 804 or the motion detector 806, sends one or more video fields and related control information to spatial interpolator 808, which spatially interpolates the NTSC video lines to derive the appropriate PAL video lines 810, which are subsequently output to a PAL format device 811, typically a video recorder. Wherever possible, video fields derived from the same film frame are selected for building a video frame for spatial interpolation.

The actual process of spatial interpolation is disclosed in U.S. Pat. No. 4,766,484, and in *I.B.A. Technical Review Number* 8, *Digital Video Processing-DICE* (1976), the content of which is incorporated by reference herein.

Figure 10:
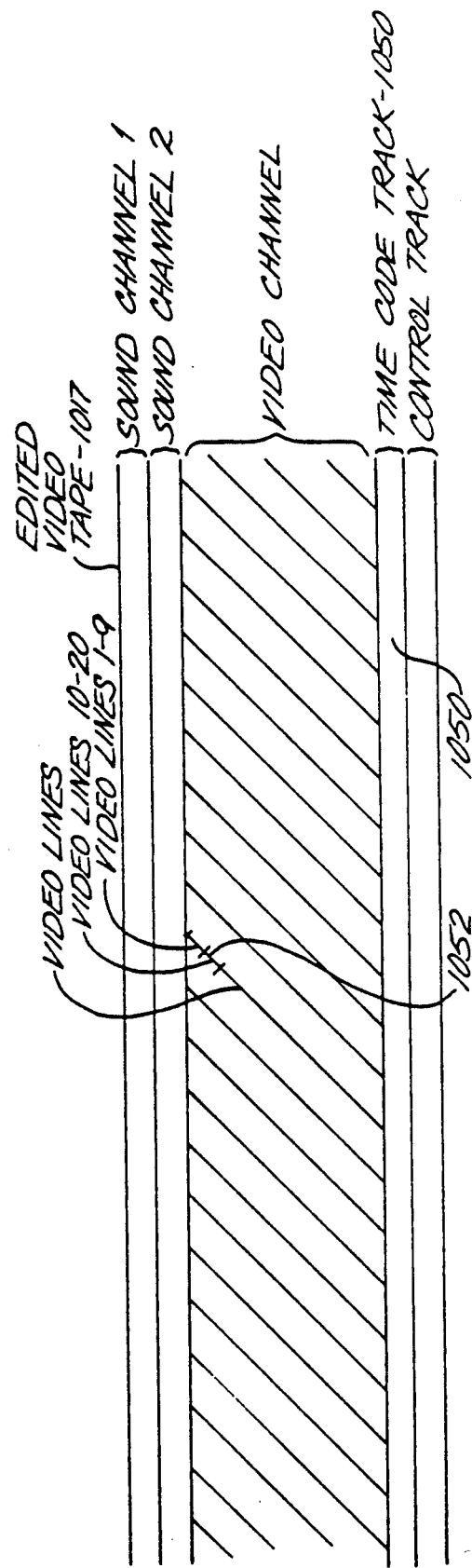
FIG. 10 is an illustration of the physical layout of a Video tape 1017 used in an embodiment of the present invention.
Figure 11:
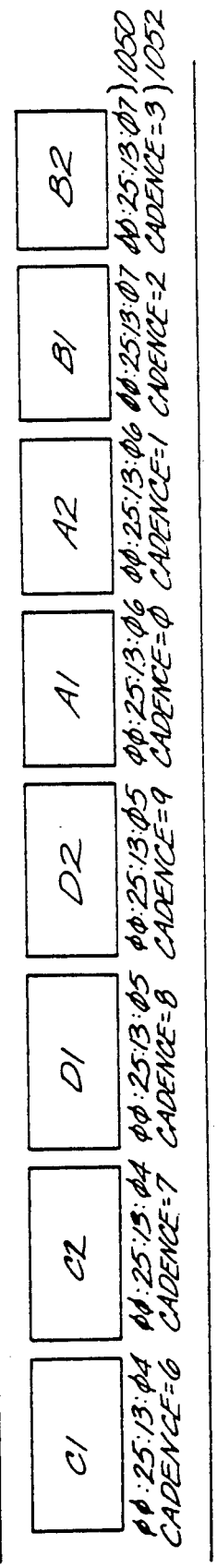
FIG. 11 is a logical layout of Video tape 1017 of FIG. 11A.

Refer now to FIGS. 10 and 11. FIG. 10 illustrates an example of the physical layout of video tape 1017. Video fields are formatted and stored on tape in diagonal tracks 1052. The time code for each video field is stored in the Time Code Track 1050. The time code could also be stored within the video signal, between lines 10 and 20. This is known as Vertical Interval Time Code (VITC). Using similar technology, time code and cadence data could be generated in each field at the time of film transfer (telecine) and encoded between lines 10 and 20. Since the data for each field is stored on the video tape 1017 with its respective video field, whenever a field is copied from one tape to another, during editing or copying, the data for that field, including the Time Code Track and cadence, if present, is copied as well and thus is integral with a field of data.

FIG. 11 presents the same video tape 1017 in a logical format, showing the value of individual time codes and cadence numbers in relation to their corresponding field in the time code track 1050. For example, the field C1 has a cadence number of 6 and a time code of 00:25:13:04. Note that each field does not have its own time code, but a time code is unique to a frame. Each of the two fields making up a video frame have the same time code, but can be distinguished because one is a field 1 and the other is a field 2.

The time code is expressed in the format "HH:MM:SS:FF", which indicates the hour, minute, second, and frame at the time a frame was made. By way of example, the first frame on a roll of video tape is assigned a time code of 00:00:00:00, and the fourth frame of the 13th second of the 25th minute of a video tape has a time code of 00:25:13:04.

The cadence number between 0 and 9, and indicates where a field fits into the 10 fields of one 3-2 cadence pattern as follows:

| Cadence Number | 0 | 1 | 2 | 3 | 4 | 5 | 6 | 7 | 8 | 9 |
|---|---|---|---|---|---|---|---|---|---|---|
| Field | A1 | A2 | A1 | B2 | B1 | | C2 | C1 | C2 | D1 | D2 |

While the relationship of cadence number to the time code is not always straightforward (for example, the cadence number for 01:45:32:12 is not necessarily always 2), the cadence number can be calculated from the time code and need not be provided from video tape to the translator.

Figure 9:
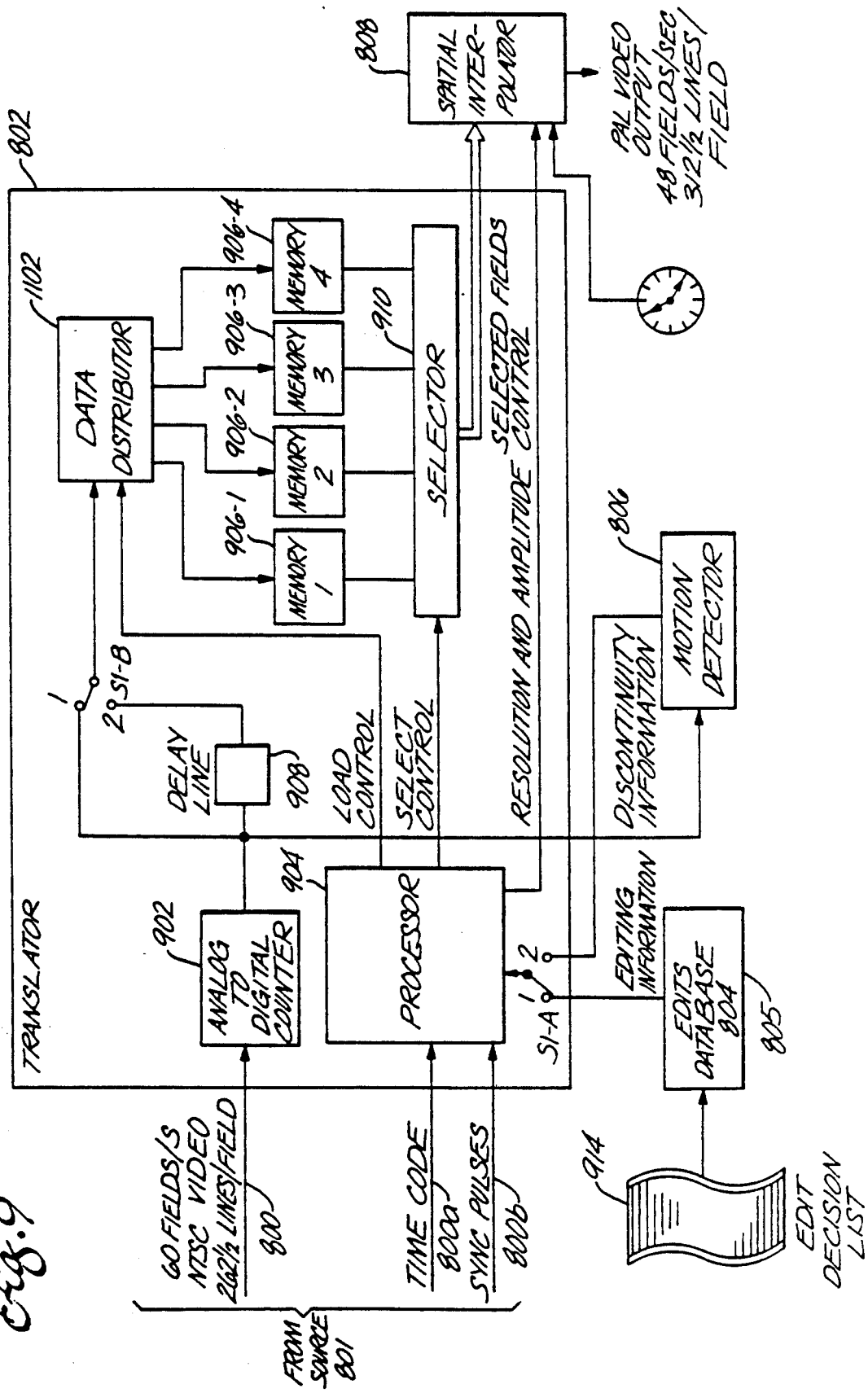
FIG. 9 is a more detailed block diagram of a standards convertor and embodying the present invention.

Table 1 depicts excerpts from a simplified EDL 914. The EDL is an industry standard list created by a video program editor, is stored on tape or the like, and is used to generate database 804 (FIG. 9). Each row entry in the EDL 914 represents an editing event, where the editing event is described by the data in the entry. The Edit# column identifies the order of the editing events in the EDL; the Reel column identifies the source reel of the edited material; the Type column indicates whether the edited material is placed on the destination tape as a simple cut (C), or as a dissolving scene (D); the Source From and To columns indicate the range of locations on the source tape that are copied to the destination tape, at the range of locations indicated in the Destination From and To columns. Industry practice dictates that all edits on a video tape shall either start on field 1 or field 2 and end on field 2 or field 1, respectively. The method used is described as field 1 or field 2 dominance and must be known or measured prior to using an Edit Decision List (EDL). The following example uses a field 2 dominance EDL. Editing event 013 consists of a cut of video put on the destination tape starting at time code 01:00:54:12, field 2, and ending at time code 01:00:55:17, field 1. The source for this section of video is reel 003, from time code 03:25:13:20, field 2, to 03:25:14:25, field 1.

Table 2 is a representation of the content of database 804 derived from Table 1. Each line of Table 2 describes a discontinuity on an edited tape and also describes some characteristics of the video material which follows the discontinuity. These discontinuities signal disturbances in the regular 3-2 cadence of the NTSC signal 800 of FIG. 12 being input to the translator 802. For each row entry, Table 2 contains the Time Code column showing the time at which the discontinuity occurs, and coincides with the beginning of an editing event; the Edit Type column showing the type of edit, which could be a straight cut in the video (Cut), the beginning of a dissolve (Start), or the end of a dissolve (End). The 3-2 pattern is only guaranteed to exist where the original source is film unaltered by edits or special effects. The Pattern column of Table 2 indicates by "3-2" when the material contains a 3-2 cadence and by "non 3-2" when the material does not contain the 3-2 cadence. The Interpolation Mode column indicates the method of spatial interpolation that should be used for the material; the methods of spatial interpolation are motion adaptive (Adaptive) and 3-2 Mode. Motion adaptive causes the spatial interpolator to modify the interpolation using an algorithm based on the amount of motion in a series of fields as is known in the interpolation art, as disclosed in the article entitled "ISIS" by David Beanland of AVS, a manufacturer of spatial interpolators and published David Beanland "ISIS", *International Broadcast Engineer*, Vol. 22, No. 22d, pgs. 40–43 (Mar. 1989). "3-2 mode" indicates that frame interpolation is possible and directs the system to use the cadence number to select fields from the same frame for interpolation. The Cadence Load Value column contains the cadence number for the first field of the edited material coming after the discontinuity. The value in this column is only used where the material does have the 3-2 cadence, since fields in non 3-2 material cannot be assigned cadence numbers.

Table 2 is derived from Table 1. Editing event 013 will be used as an example to demonstrate the derivation. The 15th row entry in Table 2 is derived from editing event 013 and has a Time Code, 01:00:54:12 from the Destination From column of Table 1, Edit Type "Cut" from the Type column of Table 1, a Pattern "3-2" derived because the type value is not a dissolve, and an Interpolation Mode "3-2" derived from the type value, not being a dissolve, a Cadence Load Value "9" is derived from the time code in the Source From column of Table 1. The Source From for editing event 013 is shown in Table 1 as 03:25:13:20. The time code is a drop frame time code, and the cadence at 03:00:00:00, which is at the start of an hour tape, is 0. Since field 2 of the frame 03:25:13:20 is 45,364 fields from the first field on the tape, the cadence of the field is 9, meaning it is a D2 field. This number is used by the processor to restart the pattern of field selections after a discontinuity.

Refer to FIG. 9, which shows an embodiment of a translator system including the translator 802 in 15 greater detail. NTSC video signals 800, time code signals 800a and sync pulses 800b are derived from a video tape (not shown) by video source 801. The sync pulses 800b are a series of pulses each synchronized with one of the video fields from source 801. Analog-to-digital ("A/D") converter 902, converts the analog video field signals 800 representing the sequence of video fields into digitized video fields (fields). The converted fields consist of luminance and chrominance data on a line by line basis for each field as is conventional in the art. The cadence number could be present with each video field read from tape. Whereas here only the time code information is available, processor 904 mathematically derives the cadence number from the time code.

FIG. 9 illustrates two possible embodiments of the invention, one using database 804 stored in memory 805, and one using motion detector 806. Switches S1-A and S1-B select between the use of database 804 in position 1 and the use of motion detector 806 and delay line 908 in positions 2. When switches S1-A and S1-B are in position 2, since the motion detector cannot detect an editing cut in the video at least until the field just after the cut, the motion detector reads the video field data ahead of the delay line 808, in effect allowing the motion detector to look ahead in time relative to the processor 904, so that information relating to a given field is provided by the motion detector to the process in a timely manner, i.e. when the processor is processing the given field.

Processor 904 controls data distributor 1102, which loads the converted fields from A/D convertor 902 into one of four field memories, 906-1 through 906-4 (collectively memories 906), as directed by processor 904. The present embodiment uses four memories, however other embodiments could use more or less memories. There is a trade off in the number of memories; the more memories, the logic becomes less complex, but the cost is higher. Note that if a large enough number of memories are used, delay line 908 is not necessary.

The processor from the database 804 when switches S1-A and in position 1, or data from the motion detector 906 when the switches are in position 2. From this data, which includes the cadence number time code, the processor decides which fields stored in memories 906 are the correct fields to use in combination for frame interpolation. The processor directs the selector 910 to pass the correct fields from memories 906 to the spatial interpolator 808. The processor also directs the spatial interpolator in its interpolation by controlling several parameters of the spatial interpolator, the details of which are described below.

EDL is used to generate database 804, as described above.

The operation of the system of FIG. 9 when switches S1-A and S1-B are in position 1 using the database which is described in more detail with reference to FIG. 12 and when switches S1-A and S1-B are in position 2 using the motion detector and delay time described in more detail with reference to FIG. 13.

Figure 12:
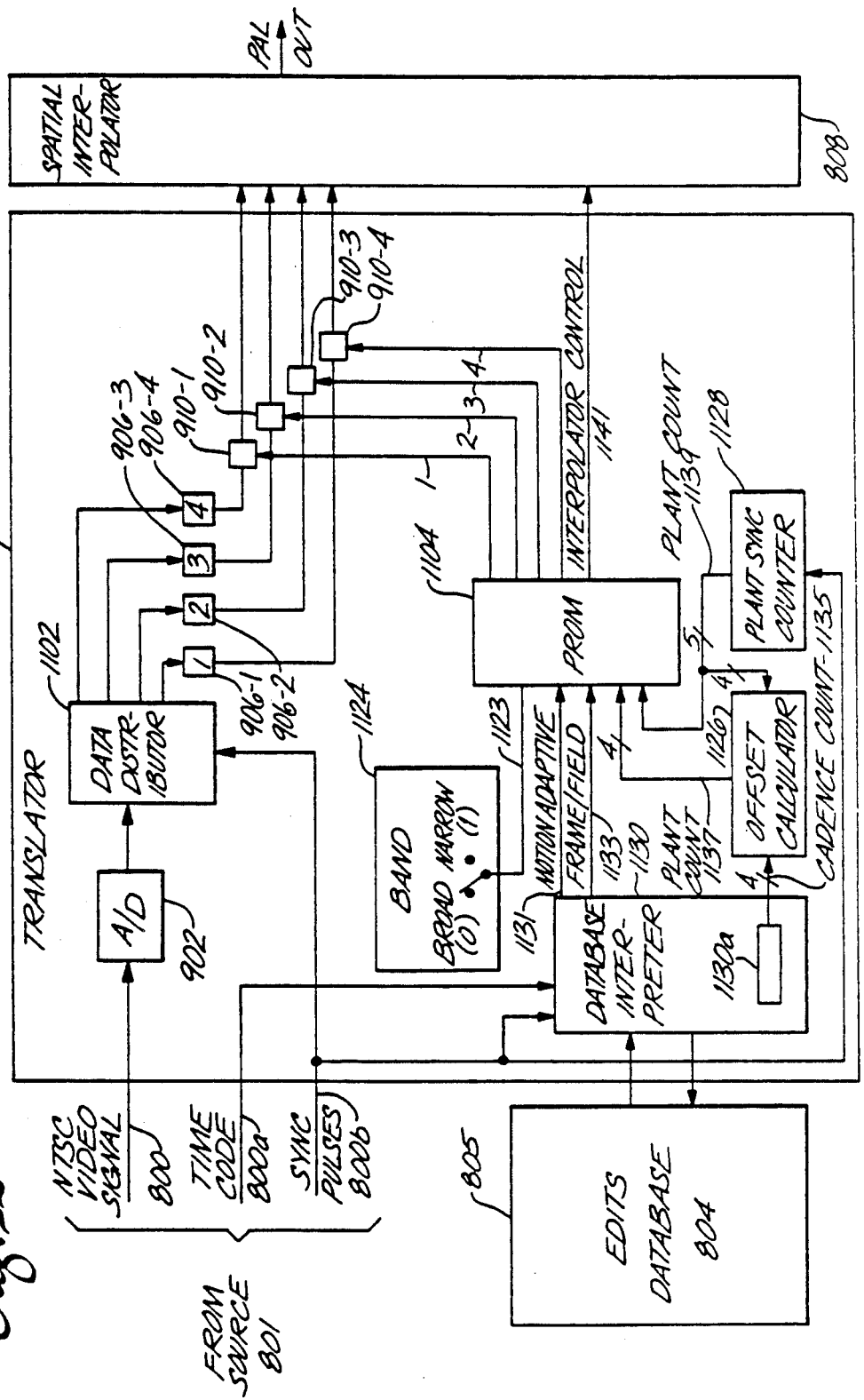
FIG. 12 is a detailed block diagram of another standards converter and employing the present invention employing an Edits Database.

FIG. 12 depicts a specific embodiment of translator 802 according to the present invention wherein the translation process is directed by the Edits Database 804 in memory 805. A data distributor 1102 routes the sequence of digitized video fields into different ones of the four memories 906-1 through 906-4. Each sequence of four fields of data is stored in order into memories 906-1 through 906-4. The first field is placed in memory 906-1, the second field is placed in memory 906-2, and so on. Subsequent fields over write the content of the memories in sequential order. Thus, the fifth field read is placed in memory 906-1, overwriting the first field, etc. The reading of a field by the selector 910 must occur before the data distributor 1102 over writes that data. The data distributor 1102 receives timing signals from the sync pulses 800b, which causes the data distributor 1102 to load a different memory with a field every 1/60th of a second. The memories 906 at any given time after the first four fields are loaded contain four consecutive fields of digitized NTSC video signals.

Database interpreter 1130, using the sync pulses 800b, keeps track of the current time and reads from database 804 information relating to the next upcoming discontinuity. Based on the information, database interpreter 1130 sets binary signals at outputs 1131, 1133 and 1135. Motion adaptive, output 1131 indicates whether (Yes) or not (No) motion adaptive is to be used. Output Frame/Field 1133 indicates whether Frame or Field interpolation is to be used and cadence output 1135 (4 bits) indicates one of cadence numbers 0 through 9 for the video material.

The purpose of database interpreter 1130 is to control the signals into the programmable read-only memory (PROM) 1104 and offset calculator 1126. The Motion Adaptive and Frame/Field outputs only change when an event such as cut, start dissolve or end dissolve occurs in the database 804. If the material requires motion adaptive processing (see Table 2, Interpolation Mode column), the Motion Adaptive output is set to Yes, otherwise the output is set to No by the database interpreter 1130. If the Motion Adaptive output is Yes, the Frame/Field and cadence outputs have no effect on PROM 1104 and PROM 1104 always causes all four memories to be selected by selectors 910 shown in Table 4A. If the material requires 3-2 mode interpolation, the database interpreter sets the Motion Adaptive output to No and sets the Frame/Field signal to Frame and a normal interpolation is performed (as described below), except when a discontinuity is between two sections of material which both have a 3-2 cadence, as indicated by database 804. If there is such a discontinuity, the Frame/Field output is set to Field for the two fields immediately before and two after the discontinuity. The cadence output 1135 is incremented, modulo 10, for each field in the video signal 800, except that at a discontinuity, the cadence sequence is restarted at the Code Value (see Table 2) number specified by the row entry in database 804.

Inputs to PROM 1104 come from database interpreter 1130, plant sync counter 1128, which continually outputs a number incrementing modulo 20 for each successive field in signal 800, and offset calculator 1126, which outputs the difference between the cadence number output of database interpreter 1130 and the plant sync modulo 10 counter 1128. Both cadence counter 1130a and plant sync counter 1128 are usually incrementing at the same rate (once per field and modulo 10) therefore, the offset calculator usually outputs a constant value. The exception to this is those times when database interpreter 1130 loads a new cadence number into the cadence counter 1130a from database 804.

PROM 1104 controls memory selectors 910-1 to 910-4 with its output 1, 2, 3 and 4 and controls spatial interpolator 808 with interpolator control output 1141. The inputs to PROM 1104 dictate the outputs. The inputs are from the Band switch 1124, outputs Motion Adaptive 1131 and Frame/Field 1133 from data interpreter 1130 output, Offset 1137 from offset calculator 1126, and output Plant Count 1139 from plant sync counter 1128. Table 4A indicates the outputs of PROM 1104 based on its inputs. For example, if Band switch 1124 is set to Broad, the Motion Adaptive output is Yes, and the Frame/Field output is Frame, the PROM outputs 1, 2, 3, 4 to the selectors 910 are all true causing all four memories to be selected, and the PROM Interpolator Control output 1141 to the Spatial Interpolator to be Broad Motion which instructs the Spatial Interpolator to process the fields using a broad-band motion adaptive algorithm.

If the Motion Adaptive output 1141 is No, then the output to the Spatial Interpolator is as shown in Table 4A and the PAL outputs to the selectors 910 are as shown in either Table 4 or Table 4C. Note that the output of PROM 1104 is dependent on the output of offset the calculator 1126 and the plant sync counter 1128 when th Motion Adaptive output 1131 is No. Table 4B shows the memories 906 selected for frame interpolation and Table 4C shows the memories selected for field interpolation. Note that two field memories are selected for frame interpolation, and one is selected for field interpolation.

Table 3 illustrates an example of the process used by data distributor 1102 of loading memories 906-1 through 906-4. The four columns beneath the heading "Memories" indicate which fields are currently loaded into the memories. The caret (" ") beneath a memory indicates which memory was most recently loaded with a new field of data.

The offset calculator 1126 outputs the difference between the value in the plant sync counter 1128 and the cadence counter 1130a. The plant sync counter counts the number of fields since the beginning of the translation process, modulo 20. This number is represented by a 5 bit signal, which is a binary coded decimal value for a number between 0 and 19. The cadence counter 1130a counts a 4 bit number from 0 to 9. The cadence number increases by one each time a field is loaded, except when the value is 9, in which case the cadence number changes to 0. When the database so indicates a cadence change, for example when the input video has been edited, cadence counter is loaded with a new value from the database.

Band switch 1124 is set manually by the user depending on the type of video being converted. The setting of band switch 1124 only effects the conversion process when Motion Adaptive output 1131 is Yes, as indicated in Table 4A. When Motion Adaptive output 1131 is Yes, PROM output interpolator control 1141, is modified by the setting of band switch 1124. As shown in Table 4A, the output interpolator control 1141 is set to Broad Motion when Motion Adaptive output 1131 is Yes and band switch 1124 is set to Broad. Interpolator control output 1141 is set to Narrow Motion when Motion Adaptive output 1131 is Yes and band switch 1124 is set to Narrow. Broad Motion causes interpolator control 1144 to command spatial interpolator 808 to process the fields sent by selector 910 using a broad motion adaptive algorithm. Likewise, Narrow Motion cause a narrow motion adaptive algorithm. The specifics of these algorithms, and the details of spatial interpolator 808, are known in the art and are disclosed in the above referenced *I.B.A. Technical Review Number 8, Digital Video Processing-DICE* (1976) and need not be repeated herein.

Consider now an example of the operation of the embodiment of the invention, depicted in FIG. 12 and Table 2. Several initial conditions will be assumed for this example. The source 801 is a video tape reader, and is reading an edited NTSC tape containing time code information on the tape. The video tape is being read from the beginning of the tape. Edits Database 804 is stored in memory 805, and the contents of the Edits Database are shown in Table 2. The memories, 906-1 through 906-4 do not contain any fields. The plant sync counter 1128 is reset so it contains 0. The band switch 1124 is set to Broad, so that output 1123 is 0.

A series of analog NTSC video field signals 800 and sync pulses 800b are generated. One sync pulse marks the beginning of each field and the corresponding time code which gives the time of the corresponding field.

Database interpreter 1130 reads the row entry from Edits Database 804. Each sync pulse 800b causes, database interpreter 1130 to compare the time code in signal 800a and the Time Code from the en-try, and take action when time code 800a approaches the value in the entry. The first entry from Edits Database 804 at line 1 of Table 2 contains a time code of 00:00 00:00. The first time code in signal 800a is 00:00:00:00, and database interpreter causes the action indicated in the remaining columns of the first entry.

The remaining columns of Table 2 instruct database interpreter 1130 what action to take. The Field column indicates whether the action should be taken at the start of the first field or the second field. Normally, in this example, most actions start with field 2, since all the video is edited on field 2. The Edit column does not apply to the first field in Table 2 of a video tape. Returning to the example, the first row entry of the Pattern column has "3-2", indicating that the video tape from the current time code to the next entry has a 3-2 cadence. The Interpolation Mode column has "3-2 mode" indicating that the video should be converted using frame interpolation. Database interpreter 1130 causes the Cadence Load Value (last column of Table 2), 0, to be loaded into cadence counter 1130a.

Database interpreter 1130 sets Motion Adaptive output 1131 to No since the Interpolation Mode column in line 1 is "3-2 mode". With a few exceptions discussed below, the Interpolation Mode column controls the Motion Adaptive output 1131, where the output is "No" when the Interpolation Mode is "Adaptive", and where the output is "Yes" where the Interpolation Mode is "3-2 mode".

During the time between row entries in Table 2, database interpreter 1130 uses the values from the immediately preceding row entry to control its output. Therefore, there are no changes until event 00:58:30:00.

After each sync pulse, database interpreter 1130 increments cadence counter 1130a one state sequencing through states 0 through 9 and returning to state 0 after state 9. After each sync pulse, plant sync counter 1128 increments its count, one state sequencing through state 0 through 19 and returning to state 0 after state 19. After each sync pulse, data distributor 1102 loads one of the incoming digitized video fields. Data distributor 1102 starts loading memory 906-3. The next three sync pulses causes data distributor 1102 to load the next three digital video fields memories 906-4, 906-1, 906-2 in video, and then returns to loading memory 906-3.

Refer now to row 4 of Table 3. This is the state of the system after 3 fields and 3 sync pulses have been received. Cadence counter 1130a is state 3 and plant sync counter 1128 is state 3, so the output of offset calculator 1126 is 0, since its output is a number between 0 and 9. Memories 906-1, 906-2, 906-3, and 906-4 contain digitized video fields A1, B2, A1, and A2, respectively.

The inputs to PROM 1104 are: band switch 1124 is Broad, Motion Adaptive output 1131 is "No", Frame/-Field output 1133 is "Frame", offset calculator 1126 output is 0, and plant sync counter is state 3.

Refer now to Tables 4A and 4B, which represent the output of PROM 1104. The output interpolator control 1141 is "Frame Interpolate", which tells spatial interpolator 808 to process fields using frame interpolation. The output to memory selector 910 represented in Table 4B under the column for Offset Value equal 0 and in the row for plant sync counter 1128 equal 3 is "4,1". Therefore, PROM 1104 activates memory selectors 910-1 and 910-4, but neither 910-2 nor 910-3. This causes the content of memories 906-1 and 906-4 to be selected for the spatial interpolator 808. Since the selected memories contain fields A1 and A2, two fields from the same film frame, frame interpolation is properly performed. Subsequently, data distributor 1102 loads memory 906-2 with digitized video field B2, as indicated in Table 3 by the caret.

The remaining row entries in Table 3 illustrate the subsequent operation of Translator 802. The Plant Sync Count 1125 column shows the progression of plant sync counter 1128 states and hence outputs at 1139, which counts from 0 to 19, then repeats. The Cadence Counter 1130a column illustrates the progression in states of cadence counter 1130a. Note that, absent a reload of cadence counter 1130a, the output 1137 of the offset calculator is a constant 0 and only the Offset Value equal 0 column or Table 4B is used. Memory Select column of Table 3 matches the column under Offset Value equal 0 in Table 4B. The Input Field column of Table 3 shows the series of fields has a 3-2 cadence in the input fields.

The Output Field column of Table 3 shows four fields are output for each five fields of input (and five sync pulses). In actual operation the four fields are evenly spaced in time, but further apart in time than the input fields. FIG. 4 illustrates the desired temporal spacing of the output PAL fields relative to the input NTSC fields from the prior art example.

The pattern indicated in Table 2 and Table 3 is repeated for line 0 following line 19, until time code signal 800a reaches 00:58:30:00 at which time the example of Table 3 ends. When database interpreter 1130 detects the time code signal in signal 800a for database frame 00:58:30:00, field 2, the row entry 2 in the database 804 causes the output pattern of PROM 1104 to change. Referring to row entry 2 in Edit Data base 804, Interpolate Mode column is adaptive causing interpreter 1130 to form a Yes on the Motion Adaptive output 1131 and the Pattern column is "non 3-2" causing the Frame/Field output 1133 to be Field and Cadence Load Value is 1 causing the cadence counter 1130a to be loaded with a 1. Referring to Table 4A, Motion Adaptive output 1131 equals Yes and Frame/Field output 1133 equals Field, causes PROM 1104 to select all four memories 906 (1, 2, 3, 4) and to provide a Broad Motion control signal on output 1141 to spatial interpolator 808 causing it to do motion adaptive interpolation.

The reason for this action is that in the case of moving from one series of fields to another series of fields joined by an editing cut, where both series have a 3-2 cadence, field interpolation is done in the area of the cut while the material before the cut and after the cut are frame interpolated. Using Table 2 as an example, the editing event (#013 in Table 1) at time code 01:00:54:12 is a cut between two series of fields each having a 3-2 cadence. The field just before the cut has a cadence of 5, which is a C2 field. Since the C1 field which matches the C2 field has been edited away, frame interpolation cannot be done. To cover these cases, database interpreter 1130 switches from frame interpolation to field interpolation for the duration of 2 fields before the cut event and the 2 fields after. More specifically, field 1 of frame 01:00:54:11 (not shown) is frame interpolated. The next field, field 2 of frame 01:00:54:11 is field interpolated, fields 1 and 2 of frame 01:00:54:12, which surround the cut, are field interpolated, and field 2 of frame 01:00:54:13 is frame interpolated.

After the cut event, the cadence counter counts by one state with each subsequent digitized video field and the operation follows that illustrated in Table 3 for a normal 3-2 cadence.

A dissolve is a special video effect where two scenes are merged by missing differing portions of each scene on a field by field basis. Generally, dissolving destroys the 3-2 cadence. Because of this lack of cadence, frame interpolation cannot be used, but motion adaptive interpolation must be used instead.

Consider an example of what happens for a dissolve in Table 2. When Database Interpreter 1130 receives time code signal 800a from frame 0:1:00:40:16, field 2, Edit Type in Start and Database Interpreter 1130 causes Motion Adaptive output 1131 to be Yes.

The end of the dissolve period is at time 01:00:41:01 in Table 2 where Edit Type is End indicating the end of the dissolve, Pattern is 3-2 indicating the start of a 3-2 cadence in the fields, Interpolation Mode is 3-2 mode and the Load Cadence value is 5 indicating the cadence of the corresponding field is 5. Database Interpolator 1130 is to set Motion Adaptive output 1131 to No so that a 3-2 mode interpolation is done, cadence counter 1130a is loaded with the Cadence Load Value of 5. The value is 5 because of the first field after the editing event is field 2 of frame 01:00:41:01, has a cadence of 5, meaning it is a C2 field. Since the original material started with a time code of 01:03:15:05 (see Table 1, line 13), and thus was a C2 field, the edited material starts with a C2 field.

The operation of Database Interpreter 1130 is the same regardless of the reason why the fields of video field signals 800 do not have a 3-2 cadence. Dissolves, and other special effects, as well as images originally captured on NTSC video does not have a 3-2 cadence.

The action of Database Interpreter 1130 in going from 3-2 cadence material to non 3-2 cadence material to switch from frame interpolation mode to motion adaptive mode.

The action of Database Interpreter 1130 in going from non 3-2 cadence material to 3-2 cadence material is to switch from motion adaptive interpolation to frame interpolation and to load a cadence load value into cadence counter 1130a so that the proper two fields can be selected by PROM 104 and selectors 910 for frame interpolation by spatial interpolator 808.

Field interpolation is done in the fields surrounding a cut because combining discontinuous fields in either a motion adaptive or a frame interpolation mode yields an undesirable output from spatial interpolator 808.

Field interpolation is in essence frame interpolation of a field containing a picture image and a field containing all black. Motion adaptive interpolation uses 4 fields whereas frame interpolation uses 2 fields and field interpolation uses only one field. In each case, only fields known to be similar in image (since they are captured at close time intervals to each other) are interpolated together. For example, at the start of a dissolve, the dissolving destroys the 3-2 cadence, eliminating the possibility of doing frame interpolation. However, the possibility of doing motion adaptive interpolation is not precluded since the field at the beginning of a dissolve is a close copy of the field just before the beginning of the dissolve, combining the fields in motion adaptive processing yields acceptable results.

The process of field interpolation is quite similar to frame interpolation except that instead of interpolating with two fields containing picture information, one field is interpolated with a black field.

This black field is created virtually in spatial interpolator 808 when only one field is loaded for spatial interpolation. When Database Interpreter 1130 sets the Frame/Field output 1133 to Field, and Motion Adaptive Output 1131 is set to No, Table 4C instead of Table 4B (as shown in Table 4A, last column) designates which fields are selected by PROM 1104. Note that the memory selections consist of 2 fields in Table 4B, but only 1 field in Table 4C.

Figure 13:
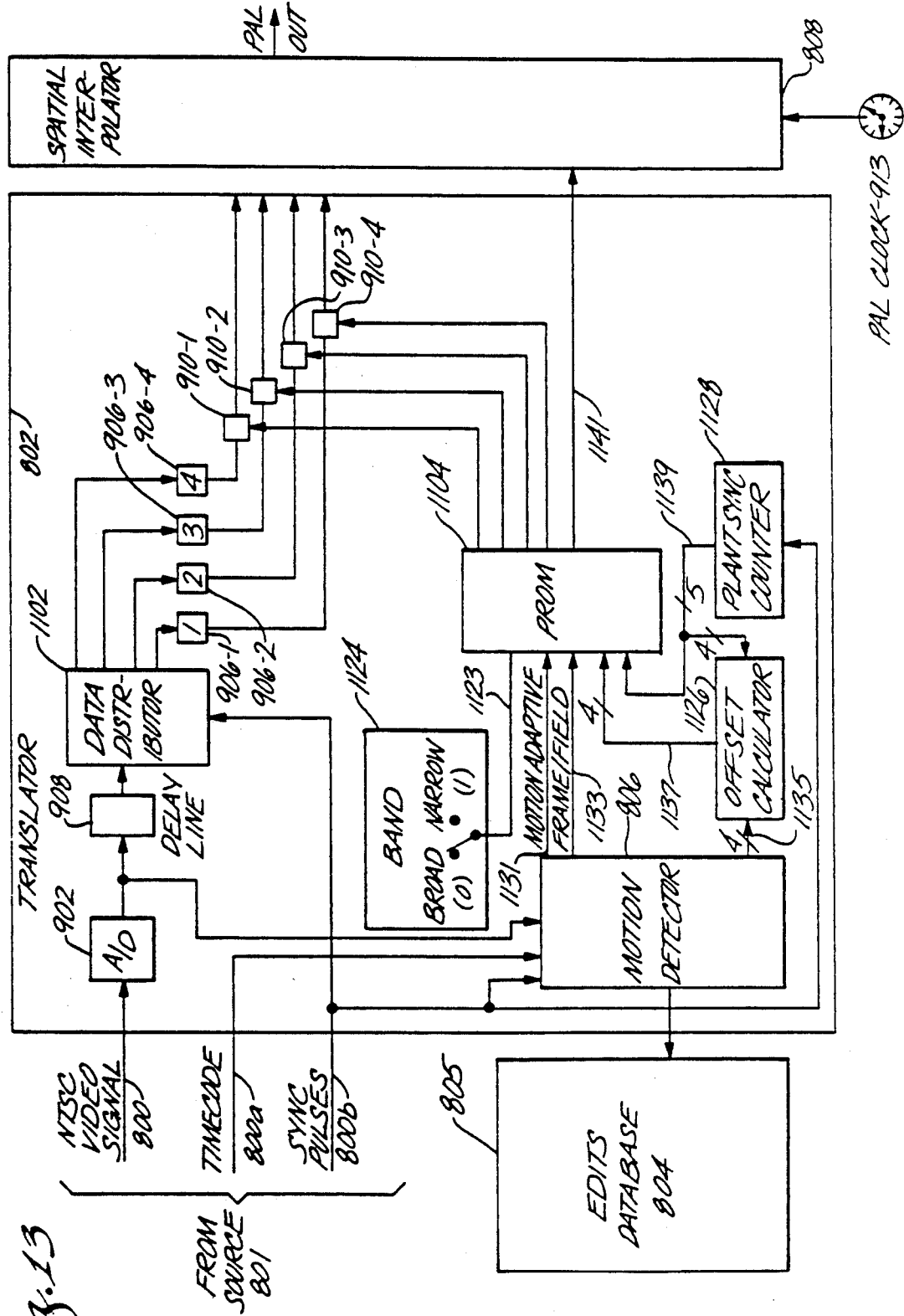
FIG. 13 is a detailed block diagram of still another standards convertor and embodying the present invention employing a motion detector.

FIG. 13 depicts an alternate embodiment of the invention, wherein a motion detector 806 is used in place of the database interpreter. The motion detector 806, based on the data from the A/D converter 902, determines the proper cadence number for a given field, and determines where the editing cuts are and whether or not a 3/2 cadence exists at all.

Although not essential to the broader concepts of the present invention, the motion detector puts the information cadence numbers and editing events into the database, as the information is determined. This is useful where the EDL of database is unavailable for an edited video tape.

The motion detector, in the embodiment of FIG. 13, utilizes a 15 field aperture for detecting movement. Other sizes are feasible, and accuracy requirements and hardware cost determine the optimum number of fields. Delay line 908 allows the motion detector 806 to get an advance look at the incoming video fields before they are stored in memories 906-1-906-4. The delay time is typically equal to just over half the aperture size, i.e. eight fields. A delay line of approximately eight fields allows the motion detector to view data from fields seven fields ahead and any number of fields behind the field currently being provided to the data distributor 1102.

The motion detector 806 detects cadence patterns and editing events by comparing two fields separated by only one field, and measuring the closeness of fit or similarity between the scenes represented by the two fields. If the input video has a 3/2 cadence, instances will occur where the motion detector is looking at two A2 fields (cadence number 1 and 3), which will have an almost perfect fit, since they derive from the same data (see FIG. 6). On the other hand, at times the motion detector will compare fields with cadence 5 and 7 (shown in FIG. 6 as B1 and C1) which do not derive from the same data. At such times the closeness of fit will be much lower. The pattern of closeness of fit allows the motion detector 806 to track the cadence pattern, and the fields are then assigned a cadence number. Once assigned, this cadence number is passed on to the offset calculator 1126. Likewise, disturbances in the pattern will be detected by the motion detector and will be flagged as editing events.

The motion detector also detects motion by doing a comparison between consecutive fields. In smooth moving pictures the difference between successive fields is likely to be small compared to the difference between two fields which span an editing cut. The absolute amount of movement from field to field could vary from different parts of a video tape, and from program to program. To determine a threshold value for the normal amount of movement, a difference is taken between each successive pair of fields over the entire 15 field aperture, to determine the average amount of movement. At a cut, the movement is likely to be many times greater than the average, so the exact location of a cut is ascertained by the motion detector.

Figure 14:
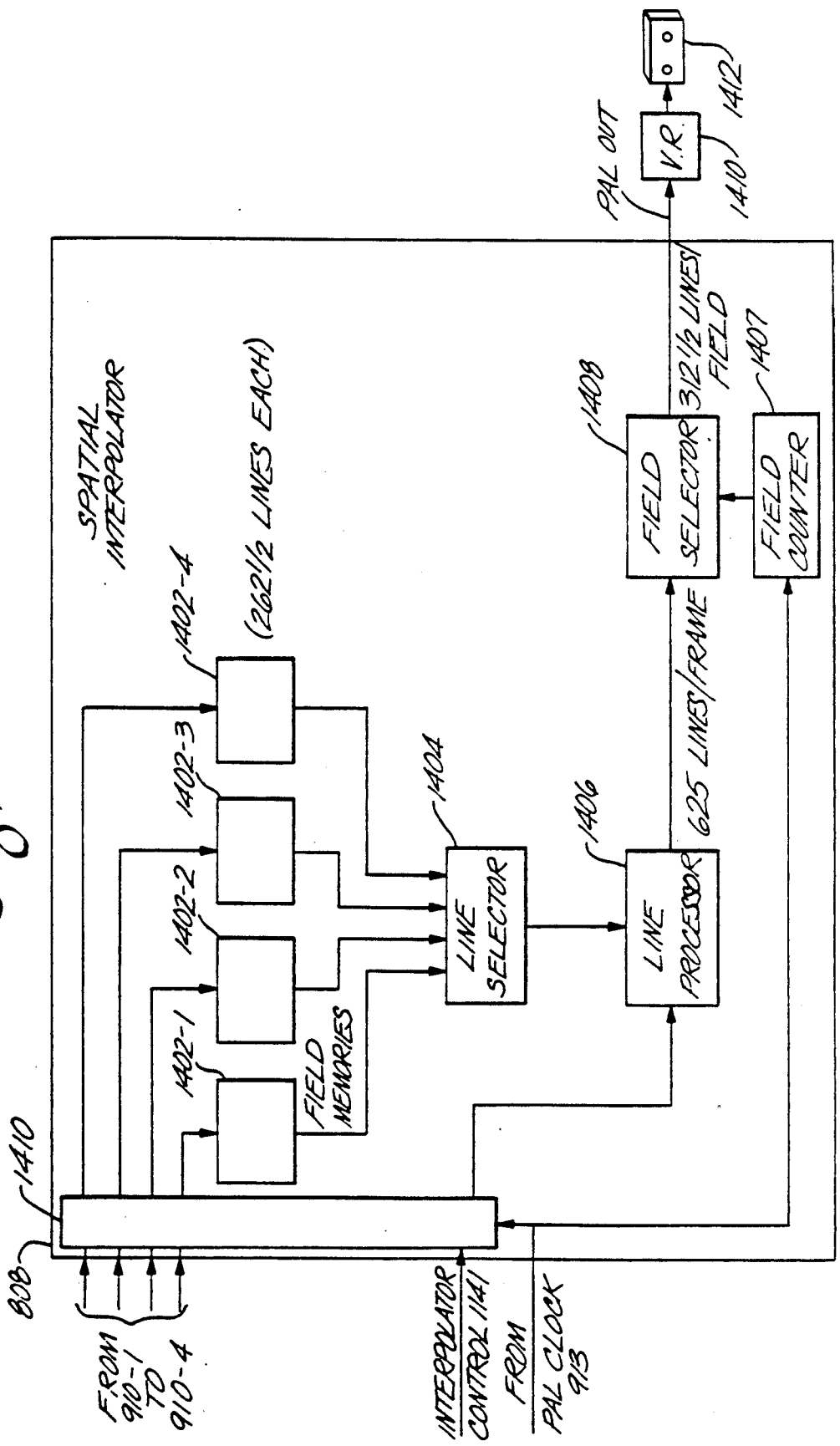
FIG. 14 is a block diagram of a spatial interpolator for use in the standards converters of FIGS. 9, 12 and 13.

Refer now to the Spatial Interpolator 808 of FIG. 14. The inputs, which are control signals and field data, come from the Translator 802. The Spatial Interpolator is known in the art but is block diagrammed here for a complete understanding of the invention. A different digitized video field set (field set), consisting of one, two or four digitized video fields, is presented by the Translator 802 synchronized with sync pulses 800b to the Spatial Interpolator 808 (for a full 1/60 of a second, each) The number of fields in the field sets depends on the type of interpolation described above, during frame interpolation two fields are in a field set, during narrow and broad band Motion Adaptive four fields are in a field set, and during field interpolation one field is in a field set. Selector 1410 controlled by clock signals each 1/48 of a second apart from PAL clock 913, selects and passes one field set presented by the Translator 802 to memories 1402-1 through 1402-4 and presents the corresponding interpolator control output 1141 signal to the line processor 1406. Since only four clock signals and hence selections occur at the 1/48 of a second rate, while 5 field sets are presented at the 1/60 of a second rate, the selector 1410 omits or skips one out of five field sets provided by the Translator 802. As a result, Line Processor 1406 presents new PAL built frames evenly and at the rate of one every 1/48 of a second.

The field sets presented by Translator 802 are stored such that the digitized video fields selected from memories 906-1 through 906-4 are selected and stored into memories 1402-1 through 1402-4, respectively. Line selector 1404 selects lines from the digitized video fields, which are present in memories 1402-1 through 1402-4 for use by the line processor 1406 in building a complete video frame. Line processor 1406 performs the interpolation of the line data from the line selector 1404 based on the direction of the Translator 802, and outputs interpolated data signals with 625 image lines which is a PAL frame.

As described above, each of the memories 1402 either contain a field selected by translator 802, or is empty. The memories collectively contain one, two or four fields, during field, frame and motion adaptive interpolation, respectively. The lines of the fields in memories 1402 at any one time are combined by Line Processor 1406 to form a PAL frame.

The four possible values for interpolator control output 1141 are field interpolation, frame interpolation, broad motion adaptive interpolation and narrow motion adaptive interpolation (see Table 4A). Each of these modes causes line processor 1406 to use a different algorithm to combine the lines from the selected fields in memories 1402 to arrive at a PAL frame as is known in the art. Field interpolation is similar to frame interpolation but the initial light values are doubled to account for the fact that frame interpolation uses non-black images and field interpolation uses one black field.

The light levels for motion adaptive interpolation are adjusted to account for the fact that four fields are used, so the light levels are set roughly half the levels used for frame interpolation. Broad and narrow interpolation vary in the weighing given to lines of the fields in memories 1402 and selected by line selector 1404. The weighing algorithm takes into account the amount of motion present in each line when determining the weighing of each line, thus the name motion adaptive.

Field selector 1408 selects every other (312½) line from the 625 lines in the PAL built frame and subsequently the remaining 312½ lines from the 625 lines to create a PAL field 1 and a PAL field 2.

Field counter 1407 alternates between state one and two each 1/48 of a second and hence is used by the field selector 1408 to select the alternative fields 1 and 2.

Since the output is 48 fields/sec, something must be done to get 50 fields/sec, as required by the PAL standard. To this end, the video tape recorder 1410 is run slowly during recording on video tape 1412, so that on replay, a video display displays at 50 fields/sec.

Although Database Interpreter of FIG. 12 has been disclosed with a cadence counter 1130, it will be understood that a microprocessor may be used in its place with appropriate computer programs to create the signals discussed above at the right times on outputs 1131, 1133 and 1135. Alternatively, a table can be used with a look-up based on information from the database 804 and the time code 800a could be used. The cadence would be generated from its table based on the time code signals 800a.

Figure 15:
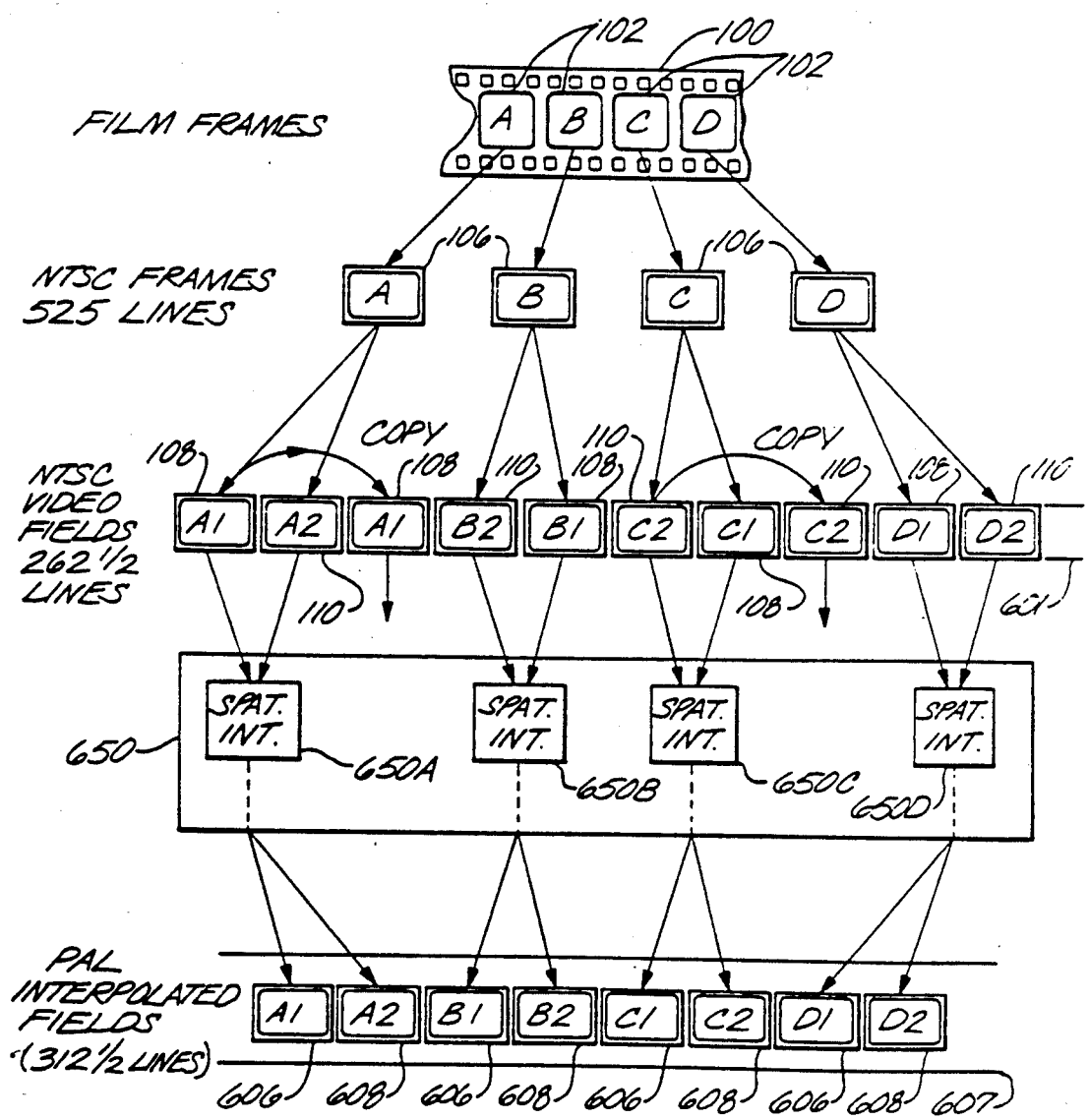
FIG. 15 is a graphic representation similar to FIG. 6 in which a spatial interpolator is modified to create a process for directly creating the pairs of fields for each PAL frame without creating an intermediate rebuilt frame.

FIG. 15 depicts an alternate embodiment of the invention similar to FIG. 6. The methods of the two figures are quite similar. However, instead of building frames 602, in FIG. 15, pairs of fields A1 A2, B2 B1, C2 C1, D1 D2, each representing the same original single image, are interpolated at 650A, 650B, 650C and 650D in a spatial interpolator 650. Spatial interpolator 650 is modified to directly create the correct number of pairs of PAL fields 606 and 608, where the pairs of fields have lines derived only from NTSC fields representing the same original image.

This modified spatial interpolator is created from a standard spatial interpolator by adding logic that causes the series of fields in signal 800 to be selected for interpolation in the same sequence as that illustrated for FIG. 12.

Figure 16:
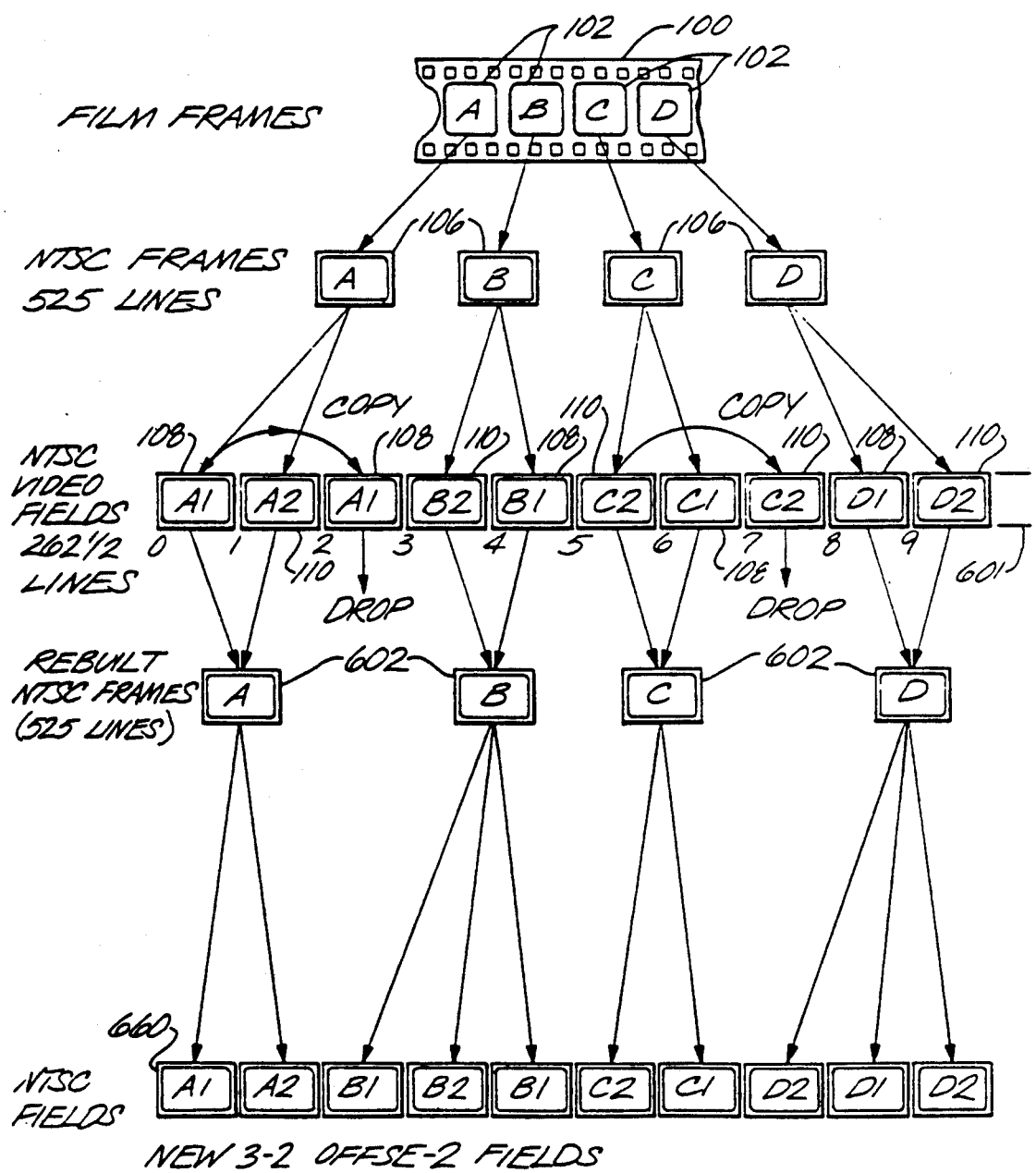
FIG. 16 is a graphic representation of a conversion process similar to FIG. 6 in which film images are converted to NTSC video and then to a different NTSC video format using a different 3-2 cadence.

FIG. 16 depicts a method according to an alternate embodiment of the invention that is similar to FIG. 6. However, in FIG. 16, the series 601 of groups of digitized video fields A1 A2 A1, B2 B1, C2 C1 C2, D1 D2 are converted to a second series 660 with second groups of fields A1 A2, B1 B2 B1, C2 C1, D2 D1 D2, respectively. Each corresponding group in the first and second series or format represents the same single image from a frame of film. The number of fields in corresponding groups of the two series differs but there is the same number of fields and groups of fields in each series. Cadence numbers 0–9 are assigned to each field in the repeating series of fields in the first format and are used to select fields for the same single image for the same group of fields in the final series. Fields selected for the same image and group are then used to build a frame 602 with only the video lines derived from fields for the same image and group. The built frames are then used to form the desired number of fields in each group of the second series. No interpolation is applied to the rebuilt frames 602 and therefore the lines in the fields of the second series 660 are the same as in the first series 601.

FIG. 17 depicts a method according to another embodiment of the invention similar to FIG. 6. However, the series of rebuilt frames 602 are converted directly to frames 102 on a film 100 without interpolation. This can be accomplished with a translation system in which the spatial interpolator is replaced with a frame that provides the rebuilt frames to a builder film recorder.

FIG. 18 depicts a spatial interpolator identical to FIG. 14 but the output of which is fed to a film recorder 700 which directly creates film frames from each rebuilt frame from the line processor 1406.

It will also be recognized that the sync pulses could be created by a timing unit synchronized with the movement of the video frames in signal 800.

An embodiment of the invention may also use the motion detector to direct the translation, and at the same time, fill in the database 804 with the information about the location of edits on the video. The accuracy of the motion detector can be tested by comparing the results of the motion detector with the entries in an EDL for a given video. Another use of the motion detector is to create a database when an EDL is not available, in order that translation in the future can proceed using the database.

Additionally, the time codes from the input fields can be used to determine where the video was edited. Further, the cadence number from the input fields can be used to determine where the video was edited.

While the one benefit of the present invention is in the improved conversion of NTSC to PAL video, many other conversion processes can be improved by use of the present invention. For example, the conversion from PAL (2-2 cadence) to NTSC (3-2 cadence) is enhanced using an embodiment of the invention. When converting from PAL to NTSC, extra fields need to be added. The proper fields to add are determined by detecting when PAL fields 1 and fields 2 match and when they do not, so that a proper 3-2 cadence can be created on the output video. If 2-2 cadence cannot be found on the PAL input tape, motion adaptive or 4-field spatial interpolation might be better than frame interpolation.

Creating double line density video is another example of a conversion that would benefit from an embodiment of the present invention. One application of double line density video is for converting NTSC 525 lines/frame to 1050 lines/frame by spatial frame interpolation. Double density video is used to create film images from video, since film requires a higher resolution to eliminate the appearance of lines on the output scene. Line doubling also applies to PAL 625 line to 1250 line conversions.

An embodiment of the invention may use variable weights for the selection of fields instead of fixed weights, as disclosed by way of examples herein.

Accordingly, the foregoing description should not be read as pertaining only to the precise structures and techniques described, but rather should be read consistent with, and as support for, the following claims, which are to have their fullest fair scope.

TABLE 1

| | | | Excerpts of a Field 2 Dominance EDL 914 | | | |
|---|---|---|---|---|---|---|
| | | | Source | | Destination | |
| Edit# | Reel | Type | From | To | From | To |
| 001 | AX | C | 00:00:00:00 | 00:00:59:28 | 00:58:30:00 | 00:59:30:00 |
| 002 | BL | C | 00:00:00:00 | 00:00:10:00 | 00:59:30:00 | 00:59:40:00 |
| 003 | AX | C | 00:00:00:00 | 00:00:10:00 | 00:59:40:00 | 00:59:50:00 |
| 004 | BL | C | 00:00:00:00 | 00:00:10:00 | 00:59:50:00 | 01:00:01:00 |
| 005 | 001 | C | 01:02:38:24 | 01:02:38:24 | 01:00:01:00 | 01:00:01:00 |
| 005 | 003 | D | 03:03:02:05 | 03:03:35:12 | 01:00:01:00 | 01:00:34:07 |
| 006 | 002 | C | 02:13:34:03 | 02:13:40:12 | 01:00:34:07 | 01:00:40:16 |
| 007 | 002 | C | 02:13:40:12 | 02:13:40:12 | 01:00:40:16 | 01:00:40:16 |
| 007 | 001 | D | 01:03:12:03 | 01:03:15:05 | 01:00:40:16 | 01:00:43:18 |
| 008 | 003 | C | 03:13:24:04 | 03:13:28:13 | 01:00:43:18 | 01:00:48:27 |
| 009 | BL | C | 00:00:00:00 | 00:00:02:00 | 01:00:48:27 | 01:00:50:27 |
| 010 | BL | C | 00:00:00:00 | 00:00:00:00 | 01:00:50:27 | 01:00:50:27 |
| 010 | 001 | D | 01:03:15:05 | 01:03:17:07 | 01:00:50:27 | 01:00:51:27 |
| 011 | 001 | C | 01:03:26:06 | 01:03:17:07 | 01:00:51:27 | 01:00:52:29 |
| 012 | 003 | C | 03:33:21:12 | 03:33:22:25 | 01:00:52:29 | 01:00:54:12 |
| 013 | 003 | C | 03:25:13:20 | 03:25:14:25 | 01:00:54:12 | 01:00:55:17 |
| 014 | 002 | C | 02:13:43:14 | 02:13:45:16 | 01:00:55:17 | 01:00:57:19 |

TABLE 1-continued

Excerpts of a Field 2 Dominance EDL 914

| Edit# | Reel | Type | Source From | Source To | Destination From | Destination To |
|---|---|---|---|---|---|---|
| 015 | 001 | C | 01:18:21:13 | 01:18:23:25 | 01:00:57:19 | 01:01:00:03 |
| 016 | AX | C | 00:00:00:00 | 00:00:00:25 | 01:01:00:03 | 01:01:00:28 |
| 017 | 001 | C | 01:25:16:13 | 01:25:19:25 | 01:01:00:28 | 01:01:04:10 |

TABLE 2

Excerpts from an Edits Database

| Time Code | Field | Edit Type | Interpolation Pattern | Cadence Mode | Load Value |
|---|---|---|---|---|---|
| 00:00:00:00 | 1 | — | 3-2 | 3-2 mode | 0 |
| 00:58:30:00 | 2 | Cut | non 3-2 | Adaptive | 1 |
| 00:59:30:00 | 2 | Cut | non 3-2 | Adaptive | 1 |
| 00:59:40:00 | 2 | Cut | non 3-2 | Adaptive | 1 |
| 00:59:50:00 | 2 | Cut | non 3-2 | Adaptive | 1 |
| 01:00:01:00 | 2 | Start | 3-2 | Adaptive | 9 |
| 01:00:03:00 | 2 | End | 3-2 | 3-2 mode | 9 |
| 01:00:34:07 | 2 | Cut | 3-2 | 3-2 mode | 9 |
| 01:00:40:16 | 2 | Start | 3-2 | Adaptive | 5 |
| 01:00:41:01 | 2 | End | 3-2 | 3-2 mode | 5 |
| 01:00:43:18 | 2 | Cut | 3-2 | 3-2 mode | 1 |
| 01:00:48:27 | 2 | Cut | non 3-2 | Adaptive | 1 |
| 01:00:50:27 | 2 | Start | 3-2 | Adaptive | 9 |
| 01:00:51:27 | 2 | End | 3-2 | 3-2 mode | 9 |
| 01:00:52:29 | 2 | Cut | 3-2 | 3-2 mode | 5 |
| 01:00:54:12 | 2 | Cut | 3-2 | 3-2 mode | 9 |
| 01:00:55:17 | 2 | Cut | 3-2 | 3-2 mode | 1 |
| 01:00:57:19 | 2 | Cut | 3-2 | 3-2 mode | 9 |
| 01:01:00:03 | 2 | Cut | non 3-2 | Adaptive | 1 |
| 01:01:00:28 | 2 | Cut | 3-2 | 3-2 mode | 5 |
| 01:01:04:10 | 2 | Cut | non 3-2 | Adaptive | 1 |

TABLE 3

EXAMPLE OF SELECTION PROCESS

| PLANT SYNC. CTR. 1128 | CAD CTR. 1130A | INPUT FIELD 800 | MEMORIES-906 3 | 4 | 1 | 2 | PROM- 1104 | FIELDS SELECTED BY SELECT.- 910 | | FIELDS OUTPUT FROM SYNC. 1412 |
|---|---|---|---|---|---|---|---|---|---|---|
| 0 | 0 | A1 | A1 | — | — | — | 1,2 | — | — | — |
| 1 | 1 | A2 | A1 | A2 | — | — | 1,2 | — | — | — |
| 2 | 2 | A1 | A1 | A2 | A1 | — | 4,1 | A1 | A2 | A1 |
| 3 | 3 | B2 | A1 | A2 | A1 | B2 | 4,1 | A1 | A2 | A2 |
| 4 | 4 | B1 | B1 | A2 | A1 | B2 | 2,3 | B1 | B2 | — |
| 5 | 5 | C2 | B1 | C2 | A1 | B2 | 2,3 | B1 | B2 | B1 |
| 6 | 6 | C1 | B1 | C2 | C1 | B2 | 2,3 | B1 | B2 | B2 |
| 7 | 7 | C2 | B1 | C2 | C1 | C2 | 1,2 | C1 | C2 | C1 |
| 8 | 8 | D1 | D1 | C2 | C1 | C2 | 1,2 | C1 | C2 | C2 |
| 9 | 9 | D2 | D1 | D2 | C1 | C2 | 3,4 | D1 | D2 | — |
| 10 | 0 | A1 | D1 | D2 | A1 | C2 | 3,4 | D1 | D2 | D1 |
| 11 | 1 | A2 | D1 | D2 | A1 | A2 | 3,4 | D1 | D2 | D2 |
| 12 | 2 | A1 | A1 | D2 | A1 | A2 | 1,2 | A1 | A2 | A1 |
| 13 | 3 | B2 | A1 | B2 | A1 | A2 | 1,2 | A1 | A2 | A2 |
| 14 | 4 | B1 | A1 | B2 | B1 | A2 | 4,1 | B1 | B2 | — |
| 15 | 5 | C2 | A1 | B2 | B1 | C2 | 4,1 | B1 | B2 | B1 |
| 16 | 6 | C1 | C1 | B2 | B1 | C2 | 4,1 | B1 | B2 | B2 |
| 17 | 7 | C2 | C1 | C2 | B1 | C2 | 3,4 | C1 | C2 | C1 |
| 18 | 8 | D1 | C1 | C2 | D1 | C2 | 3,4 | C1 | C2 | C2 |
| 19 | 9 | D2 | C1 | C2 | D1 | D2 | 1,2 | D1 | D2 | — |
| 20 | 0 | A1 | A1 | C2 | D1 | D2 | 1,2 | D1 | D2 | D1 |

TABLE 4A

LOGIC OF PROM 1104

Inputs to PROM

| Band-1124 | Motion Adaptive -1131 | Frame/Field -1133 | Outputs from PROM 1141 | MEMORIES |
|---|---|---|---|---|
| Narrow | No | Frame | Frame Interp. | (see Table 4B) |
| Narrow | No | Field | Field Interp. | (see Table 4C) |
| Narrow | Yes | Frame | Narrow Motion | 1,2,3,4 |
| Narrow | Yes | Field | Narrow Motion | 1,2,3,4 |
| Broad | No | Frame | Frame Interp. | (see Table 4B) |
| Broad | No | Field | Field Interp. | (see Table 4C) |
| Broad | Yes | Frame | Broad Motion | 1,2,3,4 |
| Broad | Yes | Field | Broad Motion | 1,2,3,4 |

TABLE 4B

MEMORIES SELECTED IN FRAME INTERPOLATION MODE

| Plant Sync. Ctr.-1128 | Offset Value from Offset Calculator 1126 | | | | | | | | | |
|---|---|---|---|---|---|---|---|---|---|---|
| | 0 | 1 | 2 | 3 | 4 | 5 | 6 | 7 | 8 | 9 |
| 0 | 1,2 | 4,1 | 1,2 | 1,2 | 2,3 | 1,2 | 4,1 | 1,2 | 1,2 | 4,1 |
| 1 | 1,2 | 2,3 | 1,2 | 1,2 | 2,3 | 1,2 | 2,3 | 1,2 | 1,2 | 2,3 |
| 2 | 4,1 | 2,3 | 4,1 | 3,4 | 4,1 | 3,4 | 2,3 | 4,1 | 3,4 | 2,3 |
| 3 | 4,1 | 1,2 | 4,1 | 3,4 | 4,1 | 3,4 | 1,2 | 4,1 | 3,4 | 1,2 |
| 4 | 2,3 | 1,2 | 2,3 | 2,3 | 3,4 | 2,3 | 1,2 | 2,3 | 2,3 | 1,2 |
| 5 | 2,3 | 1,2 | 2,3 | 2,3 | 3,4 | 2,3 | 1,2 | 2,3 | 2,3 | 1,2 |
| 6 | 2,3 | 3,4 | 2,3 | 2,3 | 3,4 | 2,3 | 3,4 | 2,3 | 2,3 | 3,4 |
| 7 | 1,2 | 3,4 | 1,2 | 4,1 | 1,2 | 4,1 | 3,4 | 1,2 | 4,1 | 3,4 |
| 8 | 1,2 | 2,3 | 1,2 | 4,1 | 1,2 | 4,1 | 2,3 | 1,2 | 4,1 | 2,3 |
| 9 | 3,4 | 2,3 | 3,4 | 3,4 | 4,1 | 3,4 | 2,3 | 3,4 | 3,4 | 2,3 |
| 10 | 3,4 | 2,3 | 3,4 | 3,4 | 4,1 | 3,4 | 2,3 | 3,4 | 3,4 | 2,3 |
| 11 | 3,4 | 4,1 | 3,4 | 3,4 | 4,1 | 3,4 | 4,1 | 3,4 | 3,4 | 4,1 |
| 12 | 1,2 | 4,1 | 2,3 | 1,2 | 2,3 | 1,2 | 4,1 | 2,3 | 1,2 | 4,1 |
| 13 | 1,2 | 3,4 | 2,3 | 1,2 | 2,3 | 1,2 | 3,4 | 2,3 | 1,2 | 3,4 |
| 14 | 4,1 | 3,4 | 4,1 | 4,1 | 1,2 | 4,1 | 3,4 | 4,1 | 4,1 | 3,4 |
| 15 | 4,1 | 3,4 | 4,1 | 4,1 | 1,2 | 4,1 | 3,4 | 4,1 | 4,1 | 3,4 |
| 16 | 4,1 | 1,2 | 4,1 | 4,1 | 1,2 | 4,1 | 1,2 | 4,1 | 4,1 | 1,2 |
| 17 | 3,4 | 1,2 | 3,4 | 2,3 | 3,4 | 2,3 | 1,2 | 3,4 | 2,3 | 1,2 |
| 18 | 3,4 | 4,1 | 3,4 | 2,3 | 3,4 | 2,3 | 4,1 | 3,4 | 2,3 | 4,1 |
| 19 | 1,2 | 4,1 | 1,2 | 1,2 | 2,3 | 1,2 | 4,1 | 1,2 | 1,2 | 4,1 |

TABLE 4C

MEMORIES SELECTED IN FIELD INTERPOLATION MODE

| Plant Sync. Ctr.-1128 | Offset Value from Offset Calculator 1126 | | | | | | | | | |
|---|---|---|---|---|---|---|---|---|---|---|
| | 0 | 1 | 2 | 3 | 4 | 5 | 6 | 7 | 8 | 9 |
| 0 | 2 | 4 | 2 | 2 | 2 | 2 | 4 | 2 | 2 | 4 |
| 1 | 2 | 2 | 2 | 2 | 2 | 2 | 2 | 2 | 2 | 2 |
| 2 | 4 | 2 | 4 | 4 | 4 | 4 | 2 | 4 | 4 | 2 |
| 3 | 4 | 2 | 4 | 4 | 4 | 4 | 2 | 4 | 4 | 2 |
| 4 | 2 | 2 | 2 | 2 | 4 | 2 | 2 | 2 | 2 | 2 |
| 5 | 2 | 2 | 2 | 2 | 4 | 2 | 2 | 2 | 2 | 2 |
| 6 | 2 | 4 | 2 | 2 | 4 | 2 | 4 | 2 | 2 | 4 |
| 7 | 2 | 4 | 2 | 4 | 2 | 4 | 4 | 2 | 4 | 4 |
| 8 | 2 | 2 | 2 | 4 | 2 | 4 | 2 | 2 | 4 | 2 |
| 9 | 4 | 2 | 4 | 4 | 4 | 4 | 2 | 4 | 4 | 2 |
| 10 | 4 | 2 | 4 | 4 | 4 | 4 | 2 | 4 | 4 | 2 |
| 11 | 4 | 4 | 4 | 4 | 4 | 4 | 4 | 4 | 4 | 4 |
| 12 | 2 | 4 | 2 | 2 | 2 | 2 | 4 | 2 | 2 | 4 |
| 13 | 2 | 4 | 2 | 2 | 2 | 2 | 4 | 2 | 2 | 4 |
| 14 | 4 | 4 | 4 | 2 | 4 | 4 | 4 | 4 | 4 | 4 |
| 15 | 4 | 4 | 4 | 4 | 2 | 4 | 4 | 4 | 4 | 4 |
| 16 | 4 | 2 | 4 | 4 | 2 | 4 | 2 | 4 | 4 | 2 |
| 17 | 4 | 2 | 4 | 2 | 4 | 2 | 2 | 4 | 2 | 2 |
| 18 | 4 | 4 | 4 | 2 | 4 | 2 | 4 | 4 | 2 | 4 |
| 19 | 2 | 4 | 2 | 2 | 2 | 2 | 4 | 2 | 2 | 4 |

What is claimed is:

1. A method of creating, from a first sequence of fields, a second sequence of fields, where each sequence of fields represents the same series of images of a moving picture, each image being at a single point in time, the first sequence comprising a plurality of groups of plural fields where each group represents a different single one of said images, each field of the first sequence comprising a first number of lines per field and each field of the second sequence comprising a second number of lines per field where the first and second numbers of lines differ, the method comprising the steps of
analyzing the first sequence of fields, to determine which of the fields belong in the same said group representing a single image;
selecting such fields for spatial interpolation, from the first sequence, that are determined to be in the same group of fields representing a single image; and
spatially interpolating the lines of the selected fields of the first sequence, to derive the lines of at least one of the fields of the second sequence.

2. The method of claim 1, wherein the first sequence of fields comprises an indication of the fields that are in the same groups and wherein the step of analyzing uses those indications to determine which fields represent a single scene.

3. The method of claim 1 where the first and second sequences are moving pictures to be viewed at different frequencies and further comprises a step of changing the number of fields in the second sequence from the number of fields in the first sequence in proportion to the ratio of the frequencies 4. The method of claim 1 comprising the step of varying the weights given to each of the selected fields during the step of interpolation based on the results of the step of analyzing.

5. The method of claim 1 wherein the step of analyzing comprises analyzing a plurality of said groups of fields of the first sequence, storing a representation of the results of the analyzing and later using the stored result in the step of spatially interpolating.

6. The method of claim 1 wherein the step of analyzing comprises the step of comparing two fields to determine if the fields represent the same scene.

7. The method of claim 1 wherein the step of selecting fields comprises the step of selecting fields representing more than one scene for interpolation when the analyzing indicates that at least two fields of the first sequence representing the same scene, are not present.

8. The method of claim 1 comprising the step of selectively reordering fields from the same group in the first sequence prior to the step of interpolating.

9. The method of claim 1 comprising the step of providing the first sequence in a sequence of fields that are moving in time, and
wherein the step of analyzing automatically reaches positions of the moving fields for analysis.

10. The method of claim 9 comprising the step of temporarily storing the moving fields for the step of analyzing.

11. The method of claim 10 wherein the step of selection takes place from the temporarily stored fields.

12. A method of creating, from a first sequence of fields, a second sequence of fields, where each sequence of fields represents the same series of images of a moving picture, each said image being at a single point in time, the first sequence comprising a plurality of groups of plural fields where each group represents a different single one of said images, each field of the first sequence comprising a first number of lines per field and each field of the second sequence comprising a second number of lines per field, the method comprising the steps of
- determining which of the fields belong in the same said group representing a single image;
- selecting such fields for spatial interpolation, from the first sequence, that are determined to be in the same group of fields representing a single image; and
- spatially interpolating the lines of the selected fields of the first sequence, to derive the lines of at least one of the fields of the second sequence.

13. The method of claim 12 wherein the step of selecting comprises the step of building each of a plurality of frames, each frame being built substantially only from the lines of the fields belonging to the same group representing a single image, the step of spatially interpolating comprising the step of spatially interpolating each of said built frames.

14. The method of claim 13 comprising the step of separating each of the built frames into first and second fields, each field comprising different groups of lines from the built frame.

15. The method of claim 1, wherein the first sequence of fields comprises an indication of the fields that are in the same groups and wherein the step of analyzing uses each said indication to determine which fields represent a single image.

16. The method of claim 1 where the first and second sequences are moving pictures to be viewed at different frequencies and further comprising the step of changing the number of fields in the second sequence from the number of fields in the first sequence in proportion to the ratio of the frequencies.

17. A method for translation between first and second video image formats where, in the first video image format there is a series of video fields in first groups, the first groups having different numbers of the fields and the fields of each first group representing a portion of the lines of a single image at a single point in time in a series of the images, the method comprising the steps of
- selecting the field group comprising at least one field from the same field group from each of a series of the first field groups,
- spatially interpolating lines represented in the same group of each of a series of said field groups to form interpolated lines, and
- forming a series of second field groups representing lines, the lines represented in each such second field group representing lines obtained in the step of spatially interpolating from the same field group.

18. The method of claim 17 comprising the step of forming, for each of the first field groups, at least two fields, where each such field represents a portion of the lines represented by the corresponding field group.

19. The method of claim 18 comprising the step of building a built frame for each of the field groups, comprising representations of the lines in each field of the field group, for use in the step of interpolating.

20. The method of claim 17 wherein the step of interpolating comprises the step of interpolating at least two fields form the same field.

21. The method of claim 17 comprising the step of reducing the number of second field groups from the number of first field groups occurring during a unit of time in the respective series of first and second field groups.

22. The method of claim 17 wherein there is an edit in the series of video fields at which there is a series of further fields which are not from the same first field group, spatially interpolating lines only from one of the further fields, to form interpolated lines; and
- forming a group of fields in the series of second field groups representing lines obtained from the one further field.

23. The method of claim 17 or 21 wherein there is an edit in the series of video fields at which there is an individual field which is not from the same field group as a field adjacent thereto in the series of video fields, and further comprising the steps of
- spatially interpolating lines only from the individual field to form interpolated lines; and
- forming a second field group in the series of second field groups representing lines obtained in the step of interpolating from only the individual field group.

24. The method of claim 17 comprising the steps of sequentially storing representations of a plurality of the fields of the first field groups in the series in a memory and wherein the step of selecting a field group comprises the step of selecting representations of fields from such memory.

25. A method for translation between first and second video image formats where, in the first video image format there is a series of video fields arranged into first groups of such fields, the first groups having different numbers of the fields and the fields of each first group each representing a portion of the lines of a single image at a single point in time in a series of the images, the number of fields making up the series of first groups repeating in a pattern, a unique cadence number being assigned to each field so as to indicate fields in each repeated pattern, the method comprising the steps of
- receiving the series of video fields;
- providing an indication of the cadence number for each said received field in each said repeated pattern;
- using the cadence numbers to select fields from each of a series of such first groups which represent one of the single images; and
- forming a representation of the single image for each of a series of the first groups from the selected fields from such groups.

26. The method of claim 25 further comprising a the step of spatially interpolating line representations of each of the fields indicated by a cadence number to be from the same first group to form representations of interpolated lines for each of a series of further frames.

27. The method of claim 25 wherein the step of forming comprises the step of forming the representations of a single image comprising the step of forming a representation of the lines of a video image.

28. The method of claim 25 wherein the step of forming the representation of the single image comprises the step of forming a film frame image.

29. A method of creating, from a first sequence of fields, a second sequence of fields, where each sequence of fields represents the same series of images of a motion picture, each image being at a single point in time of the motion picture, the first sequence comprising a plurality of groups of plural fields where each group represents a different single one of said images, each field of the first sequence comprising a first number of lines per field and each field of the second sequence comprising a second number of lines per field, the method comprising the steps of determining which of the fields in the first sequence belong in the same said group representing a single image;

selecting such fields from the first sequence that are determined to be in the same group of fields representing a single image; and deriving from each selected different group of the fields in the second sequence, each group of fields in the second sequence representing the same single image as the group of fields from which it is derived.

30. The method of claim 29 wherein in the step of deriving, the groups of fields in the second sequence are derived such that the number of lines per field is different from the first number of lines per field.

31. The method of claim 29 wherein the step of deriving comprises deriving each of at least some of the groups of fields in the second sequence with a different number of fields in a group as the group from which each group of fields is derived.

32. The method of claim 29 wherein the step of deriving comprises the step of deriving each of the groups of fields in the second sequence with a different number of fields in a group as the group from which each is derived.

33. The method of claim 31 or 32 wherein the step of deriving comprises the step of deriving the group of fields in the second sequence with a different cadence of the groups of fields as a cadence of the groups of fields in the first sequence.

34. The method of claim 29 comprising the step of deriving each group of fields in the first sequence from a single frame of a moving picture film.

35. The method of claim 29 comprising the step of forming each of the fields in the second sequence with a representation of lines which together with the representation of lines of another field in the same group represent the complete single image.

36. The method of claim 29 wherein the step of deriving each group of fields in the second sequence comprises the step of interpolating the lines represented by the fields in the selected group from which such derived group of fields is formed.

37. The method of claim 36 comprising the step of forming in each field of each group in the second sequence representations of lines derived only from lines interpolated from or derived from the same group of fields representing a single image.

38. A method of translating a series of groups of video fields, where the number of fields per group varies in the series and the fields in each group represent lines of a single image at a single point in time of a moving picture, the method of translating comprising the steps of creating a representation of each single image in the series of the single images representing a moving picture, the representation of each single image being created from within substantially only the group of fields representing such single image.

39. The method of claim 38 comprising the step of interpolating lines represented within each group of fields to create each such single image in the series.

40. The method of claim 38 wherein the series of groups comprises different numbers of fields in a repeating pattern and the step of creating comprises the step of selecting the same number of fields out of each of the groups in the series to form the single image corresponding to each such group in the series.

* * * * *

UNITED STATES PATENT AND TRADEMARK OFFICE
CERTIFICATE OF CORRECTION

PATENT NO. : 4,998,167
DATED : March 5, 1991
INVENTOR(S) : Douglas A. Jaqua

It is certified that error appears in the above-identified patent and that said Letters Patent is hereby corrected as shown below:

Column 11, line 1, delete ", and".

Column 12, line 31, delete "15".

Column 13, line 3, after "processor" insert
-- 904 uses data --.
Column 13, line 4, delete "and" and insert therefor
-- and S1-B are --.
Column 13, line 15, after "EDL" insert -- 914 --.
Column 13, lines 32,36, change "over write" to
-- overwrite -- (both occurrences).

Column 14, line 49, delete the first occurrence of "the".
Column 14, line 50, change "th" to -- the --.
Column 14, line 60, change "(" ")" to -- ("∧") --.

Column 15, line 17, insert quotes around "Broad Motion".
Column 15, line 19, insert quotes around "Narrow Motion".
Column 15, line 21, insert quotes around "Broad Motion".
Column 15, line 24, insert quotes around "Narrow Motion".
Column 15, line 39, delete the comma after "memories".
Column 15, line 48, delete the comma after "causes".
Column 15, line 50, change "en-try" to -- entry --.
Column 15, line 53, change "00:00 00:00" to
-- 00:00:00:00 --.

UNITED STATES PATENT AND TRADEMARK OFFICE
CERTIFICATE OF CORRECTION

PATENT NO. : 4,998,167
DATED : March 5, 1991
INVENTOR(S) : Douglas A. Jaqua

It is certified that error appears in the above-identified patent and that said Letters Patent is hereby corrected as shown below:

Column 16, line 51, change "frame,frame" to
-- frame, frame --.

Column 17, line 59, change "0:1" to -- 01 --.

Column 26, line 47, after "scene" delete the comma.

Column 27, line 60, change "form" to -- from --.

Column 28, line 45, delete the second "the".

Signed and Sealed this

Seventeenth Day of November, 1992

Attest:

DOUGLAS B. COMER

*Attesting Officer*  *Acting Commissioner of Patents and Trademarks*